[12] United States Patent  
Gainsboro et al.

(10) Patent No.: US 9,300,790 B2  
(45) Date of Patent: Mar. 29, 2016

(54) MULTI-PARTY CONVERSATION ANALYZER AND LOGGER

(75) Inventors: Jay Loring Gainsboro, Framingham, MA (US); Lee Davis Weinstein, Arlington, MA (US)

(73) Assignee: SECURUS TECHNOLOGIES, INC., Dallas, TX (US)

( * ) Notice: Subject to any disclaimer, the term of this patent is extended or adjusted under 35 U.S.C. 154(b) by 1226 days.

(21) Appl. No.: 11/475,541

(22) Filed: Jun. 26, 2006

(65) Prior Publication Data

US 2007/0071206 A1 Mar. 29, 2007

Related U.S. Application Data

(60) Provisional application No. 60/694,038, filed on Jun. 24, 2005, provisional application No. 60/715,742, filed on Sep. 9, 2005, provisional application No. 60/735,902, filed on Nov. 9, 2005.

(51) Int. Cl.
*H04M 1/64* (2006.01)
*H04M 3/22* (2006.01)
*G10L 17/00* (2013.01)
*H04M 1/56* (2006.01)

(52) U.S. Cl.
CPC ............ *H04M 3/2281* (2013.01); *G10L 17/00* (2013.01); *H04M 2201/41* (2013.01)

(58) Field of Classification Search
CPC .... H04L 63/0861; H04M 1/271; H04M 1/66; H04M 2203/6054; H04M 3/38
USPC ............ 379/142.04–142.06, 88.01–88.19
See application file for complete search history.

(56) References Cited

U.S. PATENT DOCUMENTS

| 5,319,702 A | 6/1994 | Kitchin |
| 5,623,539 A * | 4/1997 | Bassenyemukasa et al. ............ 379/88.02 |
| 5,655,013 A | 8/1997 | Gainsboro |
| 5,796,811 A | 8/1998 | McFarlen |
| 5,805,685 A | 9/1998 | McFarlen |

(Continued)

OTHER PUBLICATIONS

"Computer programs that react to speech gain real-world use", by Hiawatha Bray, Boston Globe, Jan. 16, 2006.

(Continued)

*Primary Examiner* — Solomon Bezuayehu
(74) *Attorney, Agent, or Firm* — Fogarty, L.L.C.

(57) ABSTRACT

A multi-party conversation analyzer and logger uses a variety of techniques including spectrographic voice analysis, absolute loudness measurements, directional microphones, and telephonic directional separation to determine the number of parties who take part in a conversation, and segment the conversation by speaking party. In one aspect, the invention monitors telephone conversations in real time to detect conditions of interest (for instance, calls to non-allowed parties or calls of a prohibited nature from prison inmates). In another aspect, automated prosody measurement algorithms are used in conjunction with speaker segmentation to extract emotional content of the speech of participants within a particular conversation, and speaker interactions and emotions are displayed in graphical form. A conversation database is generated which contains conversation recordings, and derived data such as transcription text, derived emotions, alert conditions, and correctness probabilities associated with derived data. Investigative tools allow flexible queries of the conversation database.

4 Claims, 20 Drawing Sheets

(56) References Cited

U.S. PATENT DOCUMENTS

| | | | |
|---|---|---|---|
| 5,883,945 | A | 3/1999 | Richardson |
| 5,926,533 | A | 7/1999 | Gainsboro |
| 6,054,928 | A * | 4/2000 | Lemelson et al. .......... 340/573.4 |
| 6,064,963 | A | 5/2000 | Gainsboro |
| 6,141,406 | A | 10/2000 | Johnson |
| 6,347,146 | B1 * | 2/2002 | Short ................... H04H 20/49 381/15 |
| 6,519,561 | B1 | 2/2003 | Farrell |
| 6,542,583 | B1 * | 4/2003 | Taylor ........................ 379/88.02 |
| 6,560,323 | B2 | 5/2003 | Gainsboro |
| 6,611,583 | B1 | 8/2003 | Gainsboro |
| 6,760,701 | B2 | 7/2004 | Sharma |
| 6,859,528 | B1 * | 2/2005 | Welte ....................... 379/210.02 |
| 6,920,209 | B1 | 7/2005 | Gainsboro |
| 7,079,637 | B1 * | 7/2006 | McNitt et al. ................. 379/189 |
| 7,106,843 | B1 | 9/2006 | Gainsboro |
| 2004/0022382 | A1 * | 2/2004 | Sweeney et al. ......... 379/218.01 |
| 2005/0063522 | A1 * | 3/2005 | Kim et al. .................. 379/88.02 |
| 2005/0175159 | A1 * | 8/2005 | Cooper et al. ............. 379/88.03 |
| 2005/0271251 | A1 * | 12/2005 | Russell et al. ................ 382/103 |
| 2008/0159511 | A1 * | 7/2008 | Keohane et al. ......... 379/202.01 |
| 2008/0304643 | A1 * | 12/2008 | Hodge .......................... 379/188 |
| 2009/0046841 | A1 * | 2/2009 | Hodge .......................... 379/189 |

OTHER PUBLICATIONS

"Voices of Attraction" by Anmol Madan, Ron Caneel, Alex "Sandy" Pentland MIT Media Laboratory Technical Note No. 584, Sep. 2004.

"Classical and Novel Discriminant Features for Affect Recognition from Speech" by Raul Fernandez & Rosalind W. Picard, Interspeech 2005.

"EARS RTO3S Diarization" by Doug Reynolds, Pedro Torres, Rishi Roy, May 20, 2003.

"Social Signaling in Decision Making" by Ron Caneel, Massachusetts Institute of Technology, 2005.

"PSTL's Speaker Diarization", by Patrick Nguyen & Jean-Claude Junqua, Panasonic Speech Technology Laboratory (prior to Feb. 27, 2006).

"Emotive Alert: HMM-Based Emotion Detection in Voicemail Messages" by Zeynep Inanoglu & Ron Caneel, MIT Media Lab Technical Report No. 585, Jan. 2005.

"Speaker Recognition in a Multi-Speaker Environment" by Alvin F. Martin, Mark A. Przybocki, National Institute of Standards and Technology (prior to Feb. 27, 2006).

"Emotion Detection From Speech to Enrich Multimedia Content" by Feng Yu, Eric Chang, Ying-Qing Xu, Heung-Yeung Shum, Microsoft Research China (prior to Feb. 27, 2006).

* cited by examiner

MULTI-PARTY CONVERSATION ANALYZER AND LOGGER

CROSS-REFERENCE TO RELATED PATENT APPLICATIONS

This patent application claims priority to U.S. provisional patent applications 60/694,038 (filed Jun. 24, 2005), 60/715,742 (filed Sep. 9, 2005), and 60/735,902 (filed Nov. 9, 2005), which are herein incorporated by reference.

FIELD OF THE INVENTION

The field of the invention relates to prison phone systems, automatic monitoring of phone calls and conferences, speaker recognition, speaker identification, detection of three-way calls, audio data mining, voice logging, non-vocabulary-based analysis of dialog, affective computing, and more specifically to automated analysis of multi-party conversations, automated key-word searching, and automated speech-to-text conversion.

BACKGROUND OF THE INVENTION

As the hardware and software to record conversations in digital form has become more and more affordable over recent years, recording and archiving of conversations such as customer service calls, teleclasses, business teleconferences, and calls made by prison inmates has become routine. As digital voice recorders have become more economical and easier to use, their use for dictation and note taking has been steadily increasing. It is expected that with the increasing availability of portable digital devices capable of audio recording (such as MP3 player/recorders, cell phones, and digital voice recorders) will continue to increase for many years to come, and that the uses of these devices will continue to expand. Indeed, we are approaching the time when audio recording of one's entire lifetime experience will be practical and economical. As the amount of monitored and stored audio data increases, there is an ever increasing need for technological tools which can extract information from digital audio data. Background information on a number of conversation-recording market segments, as well as background information on speech recognition, voice verification, and voice identification is presented below.

Prison Market

Modern correctional institutions face many challenges concerning phone calls made by inmates. One intent of correctional institutions is to restrict inmates from making phone calls to persons they should not be contacting. To help accomplish this aim, many modern prison phone systems require inmates to use an identifying PIN to use the phone system, and the phone system enforces limitations on numbers which can be directly dialed, based on the prisoner's individual PIN. Many prison phone systems, for instance, limit a given prisoner to dialing one of a pre-approved set of phone numbers when making calls. One example of the type of phone call inmates are not allowed to make is phone calls to other convicted criminals (either in other prisons, or out on parole). Another example of the type of phone call inmates are not allowed to make is phone calls which threaten, intimidate, or harass someone. Another type of phone call prisoners have occasionally made which have embarrassed officials is a phone call to a public radio station, where the prisoner winds up speaking on the radio without authorization. One way in which inmates circumvent the limited-dialing restrictions of modern prison phone systems is to make a phone call to an "allowed party", who has invited over to his or her residence a "disallowed party", who then participates in the phone call after the phone is initially answered by the allowed party. Another way in which inmates circumvent the limited-dialing restrictions of modern prison phone systems is to make a phone call to a friend who has three-way calling, and then have that person conference in a person at another telephone number (which is not approved for the prisoner to be dialing). Another way that inmates circumvent the dialing limitations is to have someone at an allowed number set their phone to call-forward to another number (which is not approved for the prisoner to be dialing). One brand of prison phone systems boast a "third-party-call-indicating click detector" feature, which is designed to detect a set of supposedly telltale click sounds on the line when a third party is conferenced on to the line. Such detectors are unfortunately unreliable at best, because many modern telephone systems don't create any particular noises on the line when conferencing in a third party, or when forwarding a call to another number, but none the less, prison officials have been motivated by the promise of such systems enough to purchase phone system upgrades. Indeed, word of the existence of such systems has spread among inmates, along with the belief and story that if inmates in a conversation (where a third party is being conferenced in) are making enough noise at the time of the conferencing clicks, then the system will not detect the clicks.

To continue to market "conference call click detecting" systems to prisons in the face of such stories, manufacturers of such systems have utilized phone system hardware that separates the electronic signals produced by the phone the inmate is talking on at the prison, from the electronic signals coming in from the outside phone network. Telecommunications with the incoming and outgoing signals separated is sometimes referred to as four-wire telephony (in contrast to the two-wire telephony systems typically used in homes, where incoming and outgoing signals share the same pair of wires). We will also refer to this four-wire technique in this document as "telephonic directional separation". When click detection algorithms are run on only the signals coming in from the outside phone network, clicks can be detected (if they exist) regardless of how much noise a prisoner makes on a phone at the prison. In addition to click detection methods, tone detection methods such as those described in U.S. Pat. No. 5,926,533 (which is herein incorporated by reference) are known in the art. However, if a given outside phone system accomplishes call conferencing without creating clicks or tones, the call conferencing can not be detected through click or tone detection. There is a need for innovative technology which can detect conference calls in situations where no tell-tale clicks or tones are present.

A compounding problem facing corrections facilities today is that detecting and automatically disconnecting a call based on the fact that it is a conference call or a forwarded call may not be the right thing to do in some circumstances. For instance, if someone an inmate is allowed to call at home sets his home phone to forward to his cell phone if he doesn't answer at home, the call should be allowed to go through. Likewise, if one person an inmate is allowed to call wants to conference in another person that the inmate is allowed to call, such a call should not be automatically disconnected. There is a need for innovative technology which will not interrupt conference calls and forwarded calls which should be allowed to take place, while automatically disconnecting instances of call forwarding and conference calling which should not be allowed to take place.

The quantity of phone calls made on a daily basis from modern correctional institutions is large, and even though many correctional institutions record all phone calls made by inmates, it is a financially infeasible task to manually review, spot monitor, or manually spot review all phone calls made, and even if such manual monitoring were feasible, persons monitoring the calls would be unlikely to know if a given call was forwarded to someone at a different number than the number that was dialed, and the entire call might have to be listened to in order to detect an instance of conferencing in a third party. There is a need for more automated monitoring with innovative features which would statistically allow a high degree of accuracy in pinpointing phone calls which went to an un-allowed party.

Even when inmates are talking to allowed parties, it is desirable to prevent inmates from facilitating illegal activity via their phone calls. Techniques (such as described in U.S. Pat. No. 6,064,963, which is herein incorporated by reference) are known in the art for automatically spotting key words in conversations. Unfortunately it can be difficult to know what key words to look for, because inmates know that all their calls are being recorded, so they may be unlikely to speak about prohibited subjects in a directly obvious manner. Even if prison officials reviewed all of every phone call made, it would be challenging to figure out the meaning of what was being said if part or all of the conversation were essentially in code. There is a need for technological advances which can aid prison officials in detecting phone calls about prohibited subjects, and there is a need for technological advances which can provide prison officials with clues to help decipher conversations which are partly "in code".

Correctional institutions are not only responsible for preventing inmates from engaging in illegal and/or harmful activities, they are also charged with rehabilitating inmates. One key factor which can aid in rehabilitating inmates is monitoring each prisoner's psychological state of mind. Monitoring inmates' phone calls can give excellent clues to inmates' states of mind, but prisons don't have the budget to have even unskilled personnel monitor the majority of phone calls made, and the level of training and attentiveness that would be required to monitor the majority of phone calls and keep psychological notes is not reasonably feasible for prisons to expend. There is a need for innovative technology and automated systems to help prison officials track the psychological states of mind of inmates.

Another challenge facing prison officials is the challenge of maintaining certainty about who is making which calls. Although many modern prison phone systems require a prisoner to enter a PIN to make calls, it is still possible for inmates to share PINs with each other, which gives them access to dialing numbers which are not on their "allowed phone number" list. There is a need for more reliable ways for prison officials to be able to detect when inmates are directly dialing non-allowed phone numbers by using identifying information of other inmates. It has been proposed to use digital signal processing Speaker Identification techniques (such as those described in U.S. Pat. No. 6,519,561, which is herein incorporated by reference)) in place of PINs to identify which inmate is making a call, but speaker identification technology is nowhere near as reliable as fingerprinting, so such an identification system has not been deemed a viable substitute for PINs.

Speaker recognition technology relies on extracting from human speech certain characteristics of the fundamental vibration rate of the speaker's vocal chords, and certain information about the resonances of various parts of the vocal tract of the person speaking, which are indicative of the physiology of that particular person's vocal tract. There are two problems that lead voiceprints to be far less individuated than fingerprints. The first problem is that there is not as much variation in the physiology of typical people's vocal tracts to provide as rich a differentiation as fingerprints provide. The second problem is that each given person's vocal tract characteristics actually vary in a number of ways depending on time of day, how much the person has been talking that day and how loud, whether or not the person has a cold, etc.

Some modern prison phone systems use voice verification in conjunction with PINs, to make it more difficult for one inmate to falsely identify himself as another inmate. Voice verification has less stringent requirements than voice identification. In voice verification, the system is typically simply ensuring that the person speaking a pass phrase has a voice that is "close enough" to the voice characteristics of the person who's PIN is used. Even with voice verification augmenting PIN usage, one inmate might "share his identity" with another inmate, by entering his PIN and speaking his pass phrase, and then handing the phone off to another inmate. Or an inmate may use a pocket dictation recorder to record another inmate's pass phrase, and then play it into the phone at the appropriate time. There is a need for more robust inmate identification technology which prevents one inmate from "handing off" his identity to another inmate in a way that would allow the other inmate to make calls to numbers which he would otherwise not be allowed to call.

The only data most modern prison phone systems keep track of and make easily searchable are records of numbers dialed, and time, date, and duration of calls, inmate who originated the call, reason for call termination (regular termination, 3-way call termination, out-of-money, etc.), type of call (collect, prepaid, debit, etc.). There is a need for tracking innovative metrics which allow prison officials to more accurately pinpoint which call recordings are worthy of human review, and speech-to-text technologies only partially address this need. It may for instance be desirable to detect when an inmate is giving orders or threatening someone. This may be difficult to do from vocabulary alone, especially since the prisoner knows the call is being monitored, and may therefore speak "in code". There is also a need for innovative technologies which offer real-time detection of prohibited calls (through detection of non-allowed call participants, and/or through the nature of the dialog between the inmate and the called party or parties), and there is the need for a system which offers prison officials the opportunity to quickly make a decision in real time as to whether a given call should be interrupted, and interrupt the phone call if needed based on real-time content of the call.

Customer Service Market

In the customer service industry, it is common for all calls to be recorded, and for a cross-section of calls to be monitored live and other calls to be reviewed later with the aim of furthering the training of customer service representatives, and increasing customer retention. The increased use of Interactive Voice Response (IVR) systems in the modern customer service industry has in many cases exacerbated the frustration that consumers experience, because one is often communicating with a computer rather than a person when initially calling a customer service department. Some companies have recently made available software designed to detect frustration on the part of consumers dealing with customer service departments. There is a further need for innovative technologies which can aid in real-time detection of live conversations (between customers and customer service agents) that are "not going well", so that customer service agents have their situational awareness increased, and/or customer service supervisors can intervene, possibly saving valuable customer loyalty. There is also a need for innovative technologies which can give customer service agents feedback and coaching to help them deal more effectively with customers.

As in other industries where large numbers of phone calls are monitored, today's technology makes it easy for a company to record and archive all customer service phone calls, but technologies are lacking in the area of automatically sorting recorded calls and flagging which ones are good candidates to be listened to by persons aiming to glean critical information, or insights which could be used to improve customer service. One challenge facing customer service call center managers is finding a way to usefully keep easily searchable records containing relevant data about recorded phone calls. Companies such as CallMiner, Inc. have begun to make products and services available which use Large-Vocabulary Continuous Speech Recognition (LVCSR) speech-to-text conversion to convert archived audio to text. While today's large-vocabulary continuous speech recognition technology has achieved reasonable accuracy when trained for a particular user, it is far less accurate in converting speech for users for who's speech the system is not trained, and further accuracy problems crop up when converting speech of more than one person in a multi-party conversation. Never the less, products and services such as those offered by CallMiner, Inc. have reached the point where their phrase and word searching functions have been deemed useful by many customer service groups.

In some customer service departments, recording of customer service phone calls also serves the purpose of legal documentation. This is true, for instance, in financial institutions such as banks and brokerages.

Teleclasses, Meetings, Lectures, Etc.

Modern technologies such as cell phones and the internet have significantly increased peoples ability to be "connected" in a variety of situations. Business meetings, conferences, and classrooms which historically took place only as groups of people coming together face to face are taking place in a variety of new and varied forms, including teleconferences, internet group voice chat sessions, video conferences and classrooms, mixed voice and text group chat sessions, and combinations of these technologies. With ever-increasing pressures for flexibility in business, it has become commonplace for the audio portions of meetings (particularly teleconferences) to be recorded and archived both for record-keeping purposes, and so persons not able to participate live in the meeting can listen to what transpired later (for instance, by cell phone or by downloading an MP3-compressed recording of the meeting to a portable MP3 player, and listening to the meeting while on the go (for instance, while traveling, commuting, jogging, etc). Distance learning organizations such as Coach University and Coachville routinely record teleclasses and make them available for download or streaming by students (both in RealAudio and MP3 format).

Even with the availability of techniques such as voice logging, and compressed audio streamable and downloadable formats such as RealAudio and MP3, there is a need for new and innovative technologies which will allow persons reviewing audio recordings of classroom sessions, teleconferences, meetings and the like to more rapidly find the portions of the recording that may be of most relevance or interest.

Speech Processing

Computational techniques of converting spoken words to text or phonemes (speech recognition), and techniques for identifying a person by voice automatically (speaker identification) and techniques for automatically verifying that particular person is speaking (speaker verification) typically employ techniques such as spectrographic analysis to extract key features of different people's voices. The following two paragraphs are included to familiarize the unfamiliar reader with some terms and graphical representations used in spectrographic analysis.

A black & white spectrogram of the utterance "phonetician" (the time-domain waveform of which is shown in FIG. 2) is shown in FIG. 3. The spectrogram may be thought of as being composed of a set of vertical stripes of varying lightness/darkness. Each vertical stripe may be thought of as representative of the frequency vs. amplitude spectrum resulting from a Fourier transform of a short time window of the time-domain waveform used to derive the spectrogram. For instance, the spectrum of a short time slice starting 0.15 seconds into the utterance who's spectrogram is depicted in FIG. 3 (representing the spectrum of the beginning of the "o" vowel in "phonetician") may be represented either by the graph in FIG. 4 or by the vertical stripe 300 of the spectrogram in FIG. 3. The dark bands of vertical stripe 300 may be thought of as representing the peaks of the spectrum in FIG. 4. Thus a spectrogram represents a series of spectral snapshots across a span of time. An alternative way of representing a spectrogram is shown in FIG. 6, where the sequential time slices are assembled in a perspective view to appear as a three-dimensional landscape.

The peaks in the spectrum in FIG. 4 (or equivalently, the dark bands in stripe 300) are referred to as the formants of speech. These peaks fall on harmonics of the fundamental vibration rate of the vocal chords as the speaker pronounces different utterances, and their relative heights and how those relative heights change throughout speech are indicative of the physiology of the particular speaker's vocal tract. Both the fundamental vibration rate of the vocal chords (shown in FIG. 3 over the time span of the utterance of FIGS. 2 and 6) and the relative amplitudes of the speech formants vary over time as any given speaker speaks. Speaker recognition and speaker verification utilize the differences between the spectral characteristics (including variations over time and different utterances) of different peoples voices to determine the likelihood that a particular person is speaking. Various techniques are known in the art for extracting from a speech sample spectral data which may be viewed as indicative of identifying characteristics of the speaking person's vocal tract. Such data is commonly referred to as a voice print or voice signature. The fundamental vibration rate of a given person's vocal chords (and certain other geometric characteristics of that person's vocal tract) can and often do vary with time of day, length of time the person has been continuously talking, state of health, etc. Thus voiceprints are not as invariant as finger prints.

Speech recognition technologies for use in such applications as speech-to-text conversion have been commercially available in products such as Dragon Naturally Speaking™ (made by Nuance Communications Inc.) and ViaVoice™ (made by IBM) for a number of years now, and recently researchers have also begun to develop software for recognizing the emotional content of speech. The word prosody (defined at Princeton University as "the patterns of stress and intonation in a language") is often used in the field of affective computing (computing relating to emotion) to refer to emotion-indicating characteristics of speech. Prosody measurements may include detecting such speech characteristics as word rate within speech, perceived loudness, sadness, happiness, formality, excitement, calm, etc. Perceived loudness is distinguished here from absolute loudness by the way the character of someone's voice changes when he or she yells as opposed to talking normally. Even if someone used a "yelling voice" quietly, one would be able to understand that the voice had the character of "yelling". Within this document, we will expand the meaning of the word prosody to include all nonvocabulary-based content of speech, including all emotional tonal indications within speech, all timing characteristics of speech (both within a given person's speech, and timing between one person in a conversations stopping speaking and another person in the conversation speaking), laughter, crying, accentuated inhalations and exhalations, and speaking methods such as singing and whispering. References in which the reader may learn more about the state of the art in prosody detection include:

1) MIT Media Lab Technical Report No. 585, January 2005, which appeared in Intelligent user Interfaces (IUI 05), 2005, San Diego, Calif., USA.
2) R. Cowie, D. Cowie, N. Tsapatsoulis, G. Votsis, S. Kollias, W. Fellenz, and J. G. Taylor. Emotion recognition in human computer interaction. IEEE, Signal Processing Magazine, 2001.
3) P. J. Durston, M. Farell, D. Attwater, J. Allen, H.-K. J. Kuo, M. Afify, E. Fosler-Lussier, and L. C.-H. Oasis natural language call steering trial. In Proceedings Eurospeech, pages 1323-1326, Aalborg, Denmark, 2001.
4) R. Fernandez. A Computational Model for the Automatic Recognition of Affect In Speech. PhD thesis, MIT Media Lab, 2004.
5) H. Quast. Absolute perceived loudness of speech. Joint Symposium on Neural Computation, 2000.
6) M. Ringel and J. Hirschberg. Automated message prioritization: Making voicemail retrieval more efficient. CHI, 2002.
7) S. Whittaker, J. Hirschberg, and C. Nakatani. All talk and all action: Strategies for managing voicemail messages. CHI, 1998.

The above references are herein incorporated by reference.

Within this document, the terms "voice print", "voice signature", "voice print data", and "voice signature data" may all be used interchangeably to refer to data derived from processing speech of a given person, where the derived data may be considered indicative of characteristics of the vocal tract of the person speaking. The terms "speaker identification" and "voice identification" may be used interchangeably in this document to refer to the process of identifying which person out of a number of people a particular speech segment comes from. The terms "voice verification" and "speaker verification" are used interchangeably in this document to refer to the process of processing a speech segment and determining the likelihood that that speech segment was spoken by a particular person. The terms "voice recognition" and "speaker recognition" may be used interchangeably within this document to refer to either voice identification or voice verification.

In order for the voices of a given person to be identified or verified in voice identification processes, a sample of that person's speech must be used to create reference data. This process is commonly referred to as enrollment, and the first time a person provides a speech sample is commonly referred to as that person enrolling in the system.

There are several ways that voice recognition algorithms can be thought of as testing a given person's voice to see if it matches a previously stored voice print. The first way is that the voice print data can be thought of as a numerical vector derived from the reference speaker's voice. A second numerical vector can be derived in a like manner from the voice under test, and a numerical algorithm can be used to compare the two vectors in a way where the comparison produces a single number that has been found to be indicative of the likelihood of a correct match.

Since the absolute likelihood of a correct match is not independent of the voices of all the people who might be tested who are not a match, a more useful method compares the voice signature of the person being tested to voice signatures from a number of other individuals, or to an average voice signature derived from a number of people. The likelihood that the voice signature under test is the voice that was used to derive the reference voice signature is then derived from the extent to which the voice signature under test matches the reference voice signature better than it matches other individual voice signatures, or the extent to which the voice signature under test matches the reference voice signature better than it matches the "average" voice signature of a population.

A third way that voice recognition algorithms can be thought of as testing a given person's voice to see if it matches a previously stored voice print is that the stored voice print may be thought of as a model which is repeatedly tested against over time using small samples of the voice under test, and the resulting test scores are averaged over time. This procedure may be used with one of the above methods to produce a likelihood score which has more certainty the longer the speech under test is listened to. This variable sample length method may have advantages in live monitoring applications and in applications where it is desirable not to waste computational resources once a desired certainty level has been attained.

SUMMARY OF THE INVENTION

It is an object of the present invention to provide automated call monitoring with innovative features which will allow call reviewers and prison officials a high degree of accuracy in pinpointing phone calls which inmates make to non-allowed parties. It is a further object of the present invention to aid prison officials in detecting phone calls in which inmates converse about prohibited subjects or subjects which are of interest to investigators, and to provide prison officials with data which can help decipher conversations which are partly "in code". It is a further object of the present invention to provide information which can aid prison officials in detecting when inmates attempt to use identifying information of other inmates (including biometric information) when making phone calls. It is a further object of the present invention to provide information which will allow prison officials to more accurately pinpoint which call recordings are worthy of manual review, and to provide real-time detection of conditions that might indicate prohibited calls, and facilitate interruption of such calls by prison officials. It is a further object of the present invention to provide automated characterization of and record keeping of emotional characteristics of speech within phone calls made by inmates in such a way as to aid prison officials in rehabilitating inmates. It is a further object of the present invention to provide a searchable database of useful summary and detailed metrics concerning the conversations in a phone call archive as might be kept by a prison system or a customer service department. It is a further object of the present invention to automatically extract summary information from phone conversations which will assist in sorting recorded customer service conversations and flagging which ones are good candidates to be listened to by persons aiming to glean critical information, or insights which could be used to improve customer service.

It is a further object of the present invention to allow call reviewers to define the characteristics of calls they are interested in reviewing, from a menu of identifiable conversational aspects and characteristics, where the available menu grows over time as new searchable characteristics and aspects are defined (and methods of identifying those aspects and characteristics are developed) over time. It is a further object of the present invention to automatically extract information from phone calls which will assist in sorting recorded customer service calls and choosing which ones should be listened to by persons aiming to glean critical information to improve customer service.

It is a further object of the present invention to facilitate the automated analysis of a past archive of inmate phone calls, to extract trend information about emotional states, and to establish a database of summary and detailed information, including voice characterization data of persons who have participated in past phone conversations. It is a further object of the present invention to extract correlation information between psychological trends detected through prosody measurements, and subsequent inmate problems or improvements of various types. It is a further object of the present invention to derive psychological indicators and speaker identification information from speech mannerisms. Within this document, speech mannerisms will be deemed to include use of particular combinations of words (such as colloquialisms), frequency of use of various words (such as swear words, both as modifiers for other words, and not as modifiers), frequency and context of use of words and sounds some people use as conversational filler (such as the sound "aah", or the word "like"), phrases which may be habitually used to start speech segments (such as the phrase "OK", or the word "so"), regional accents, elongation of pronunciation of words (for instance where the elongation may indicate a state of mind such as contemplation), etc.

It is a further object of the present invention to facilitate the automated analysis of a past archive of customer service phone calls, to extract trend information about emotional states and speaking styles of customer service representatives, and to establish a database of summary information concerning speaking style and particular conversational challenges for each customer service agent, based on prosody information. It is a further object of the present invention to extract correlation information between emotional trends of customer service representatives (as derived from automated analysis of prosody information in recorded phone calls), and subsequent performance or psychological problems on the job. It is a further object of the present invention to facilitate the automatic detection of prosodic and linguistic trends in a customers speech (for instance over a single phone call, or over a number of different calls with the same customer over time) which may indicate the likelihood that a customer may be amenable to a sales offer, or that a customer may likely take an action such as seeking a different service provider.

It is a further object of the present invention to improve the performance of text-to-speech conversion of electronically monitored conversations (whether or not such conversations are "recorded" in the traditional audio sense), by segmenting speech by participant (a process also sometimes herein and elsewhere referred to as diarization) within a monitored conversation, before performing speech-to-text conversions such as might be performed through techniques such as LVCSR or iteratively self-improving LVCSR. It is a further object of the present invention to provide more accurate diarization of multi-party phone calls than is currently available in the art. It is a further object of the present invention to facilitate the use of speech-to-text conversion in inmate conversation monitoring applications, for both speech of inmates, and speech of persons inmates speak with frequently, by segmenting the speech of phone conversations by person speaking before performing iteratively self-improving speech-to-text conversion. It is a further object of the present invention to facilitate the implementation of iteratively self-improving speech-to-text conversion (in customer service applications) for customer service representatives, by segmenting the speech of customer service phone conversations by person speaking before performing speech-to-text conversion.

It is a further object of the present invention to improve the speech-to-text conversion of electronically monitored teleconferences and classrooms and the like through segmenting speech by individual, and to improve the searchability of databases of recorded and/or text-converted conversations by storing prosody information which is correlated with audio and/or text information, enabling searching audio and/or text conversation databases for emotional criteria as well as word or phrase criteria. It is a further object of the present invention to allow persons reviewing recorded conversations (such as classroom sessions, teleconferences, meetings and the like) to more rapidly find the portions of the recording that may be of most relevance or interest. It is a further object of the present invention to facilitate the marking (by customer service agents, supervisors, or call reviewers) of conversational segments deemed to be of interest, to facilitate building better search criteria and automated search models.

It is a further object of the present invention to facilitate automated disconnection of calls where unauthorized parties participate in a call, while not disconnecting conference calls and forwarded calls in which only authorized parties participate.

It is a further object of the present invention to provide an enhanced conversation database which may be queried based on prosody, speaker identity, spoken phrases, words, and phonetic sequences. It is a further object of the present invention to provide a transcribed audio (text) and prosodic indicator database which contains not only transcribed words and correlated prosodic indicators and correlated speaker identification indicators, but also each word's estimated probability of correctness (or certainty level), and alternate words and their probabilities of correctness, and each prosodic indicator's certainty level, and each speaker identification certainty level. It is a further object of the present invention to provide a segmented conversation database where quality level of each segment is estimated and stored, where quality levels may include signal-to-noise ratio, channel quality (such as cell phone vs. land line), and noise characterization (such as other voices, broadband noise, tone noise, or echo). It is a further object of the present invention to create such a conversation database which also contains an uncompressed and/or compressed version of the original audio conversations, segmented and linked with the above data extracted from those conversations.

It is a further object of the present invention to provide a novel user interface which displays speaker identification information, prosodic information, and intercommunication information in such a way that this information can be quickly assimilated by conversation reviewers.

The present invention has a number of aspects which facilitate the automated monitoring and characterization of multi-party conversations, the automated building of special-purpose databases of conversations and extracted conversation data, and innovative and useful graphical and animated interfaces to review such data. In one aspect, the present invention automatically analyzes voice characteristics of conversation participants, and determines how many people are participating in the conversation, and what segments of speech in the conversation come from each participant in the conversation (diarization). In one aspect, the diarization features of the present invention take advantage of the fact that speaker identification techniques become far more reliable when the total number of voices which must be distinguished from each other is limited (i.e. it is limited to the number of people on the call). In another aspect, the diarization features of the present invention make use of differences in volume envelope of different segments of the conversation spoken by different individuals. In another aspect, the diarization features of the present invention make use of differences in channel characteristics of the channels through which different conversation participants are speaking (for instance, channel characteristics imparted by a VOIP voice compression algorithm, channel characteristics imparted by cell phone voice compression algorithm, or the spectral characteristics imparted by a particular telephone handset microphone).

In some embodiments, the diarization features of the present invention also take advantage of hardware-assisted separation, such as four-wire telephony for telephone conversations, directional microphone techniques, or near/far field discrimination techniques. In one embodiment, after separating speech segments by speaker, the present invention utilizes Large-Vocabulary Continuous Speech Recognition (LVCSR) techniques in combination with a variety of known prosody measurements and some innovative prosody measurements on participants' speech. This combination of prosody and text-to-speech features enables mining of past recordings (and real-time conversation monitoring) which can detect both emotional state, vocabulary and phrase use, and speech mannerism and pattern classification in combinations which greatly enrich functionality in known applications such as customer service and prison phone monitoring, and facilitates novel applications such as those described below meeting analysis, social interaction analysis, counseling training, coaching training, negotiation training, teacher training, public speaking training, etc.

The speech segmentation and prosody features of the present invention facilitate a host of innovative applications including:

Classroom auditing of student verbal participation

Speech emotion monitor for men to learn to pay more attention to the emotional content of communications from women.

Automated characterization of classroom teaching style and interaction style of professors, teachers, and the like.

Interaction training aid for customer service agents and hotline counselors.

Accuracy improvement aid for automated speech recognition systems and automated speech-to-text systems.

Automated monitoring and characterization of home conversations to provide automated feedback to improve interactions, provide non-biased information for therapists and counselors, and/or provide evidence for courtroom proceedings.

Relationship conflict detector and/or early warning system.

General-purpose monitoring of personal emotional states in conversation, to facilitate increased self-awareness and self-improvement.

Automated assistance for psychologists.

Training tool for special-needs emotional patients who need to become better at emotional control (real-time emotional feedback system).

Automated special-purpose conversational training aid for persons wishing to alter habits such as interrupting people, talking too long, negating what others say, etc.

Training system for actors, courtroom attorneys, politicians, clergy, and public speakers.

Interactive sensor for games (such as virtual reality games, role-playing games, video games, etc.).

In a preferred embodiment for use in monitoring prison inmate phone calls, the present invention uses speaker recognition techniques to derive vocal-tract-physiology-correlated characteristics of each voice in a phone conversation, and then creates a summary log of the conversation, indicating how many people took part in the conversation, how long into the conversation each person joined the conversation, what the period of non-voice time was just prior to each person joining the conversation, how many times each speaker in the conversation interrupted each other speaker, and a host of summary prosody factors for each speaker.

In a preferred embodiment, a summary of prosody information generated for each participant in the conversation includes the range of perceived loudness with which each participant spoke in the conversation, the number of times that each person spoke above a certain perceived loudness threshold in the conversation, the range of speaking rates at which each person spoke, the range of pause times within and prior to each person's speech, and the percentage of time each person speech was flagged as "happy", "sad", "urgent", "formal", "calm", "angry", "sarcastic", "disbelieving", "commanding", "sinister", "seductive", "excited", and any other verbally identifiable emotional states. In addition, in a preferred embodiment, voice stress analysis is also performed and voice stress data is stored for conversational segments (and may be displayed in real time), and may be used for instance to give an indication of the probability of lying.

The present invention also makes available more comprehensive statistics about the conversation, in graphical form. These statistics include graphs (separated by participant) of the above-listed prosody factors of each participant's speech over time throughout the conversation.

The present invention allows conversations to be recorded in their entirety (including "silence"), and very quiet passages (which often don't contain any symbolically communicated information such as whispering, tapping, or the like) can either be skipped or listened to at playback. In prison phone system applications, this makes sure that authorities reviewing a given conversation at a later time need not miss possible points in a conversation where one or more participants in a conversation might whisper very quietly to avoid being recorded. In a preferred embodiment for use in correctional institutions, the present invention provides two optional features which can be used to enhance the signal-to-noise ratio of recorded phone conversations. The first feature is an audio threshold gateway which only allows audio to pass between calling and called parties if certain metrics (such as absolute loudness of the audio signal, or computed speech signal-to-noise ratio) are above preset thresholds. The second feature is a noise injection feature which injects noise into the conversation such that the participants hear the noise (and thus talk louder and/or more clearly), but the noise does not appear in the conversation as it is monitored and/or recorded.

In a preferred embodiment, the present invention facilitates easy access to recorded speech sorted by conversational participant and order of speaking. For instance, within a recording of a meeting between Joe and Mary and Tom, a person reviewing the conversation at a later date can easily jump between all the conversational segments where Tom spoke, and can then (for instance) jump from a given conversational segment where Tom is speaking to the next conversational segment where Mary speaks. This facilitates rapidly jumping to Mary's response to something Tom said at the meeting, even if someone else gives an intervening response. In addition, in a preferred embodiment, commands such as "jump to the next time Tom responded angrily to Mary" may be given through either a text or graphical voice (LVCSR) interface. In a preferred embodiment, database queries of this type may be made within a given conversation, or across multiple conversations.

In another aspect, the present invention utilizes telephonic directional separation of the audio of inmate phone calls made from correctional facilities, and provides continuous voice signature verification in the out-going direction, to make sure that the identity of the person who first places the call remains the same throughout the call. This makes it much harder for an inmate to use identifying information of another inmate (including biometric information) to place a call.

In another aspect, the present invention allows for supervised, automatic, and semi automatic enrollment of both called and calling parties, and subsequent automatic initial and ongoing (continuous or periodic) verification of voice signatures of called and calling parties, and the system may be configured to either alert officials and/or play automated messages and/or or automatically disconnect a call in progress if the voice of an unauthorized party is detected on the line during a portion of a call where unauthorized parties are prohibited from participating in the conversation.

Within this document, the term "enrolled participant" will refer to a participant who's voice or other biometric identifying data (such as fingerprint data, retina scan data, or photographic data) is enrolled in the system, who has been recognized by the system as enrolled. In applications of the present invention concerned with identifying conversation participants or controlling in some way who participates in a conversation, the terms "allowed" and "authorized" when used to describe a conversation participant will refer either to a conversation participant who's voice or other biometric identifying data is recognized as enrolled in the system (and who is authorized to participate in a given portion of a conversation without an automated action being taken), or a conversation participant who is identified as part of a class of participants (such as women, or men, or persons who's voice or other biometric identifying data is not recognized), and who, based on his or her individual identity or class identity, is permitted to participate in a given portion of a conversation without an automated action being taken (such as an alert being generated and/or an automated message being played and/or a call being disconnected).

Within this document, the terms "unauthorized" and "unallowed", when used to describe a conversation participant, will refer to persons who have not been identified as "allowed" or "authorized". Within this document, the term "disallowed", when used to describe a conversation participant, will refer either to a conversation participant who's voice or other biometric identifying data is recognized as enrolled in the system, or a conversation participant who is identified as part of a class of participants (such as women, or men, or persons who's voice or other biometric identifying data is not recognized), and who, based on his or her individual identity or class identity, is prohibited from participating in a given portion of a conversation.

DETAILED DESCRIPTIONS OF SOME PREFERRED EMBODIMENTS

Figure 1:
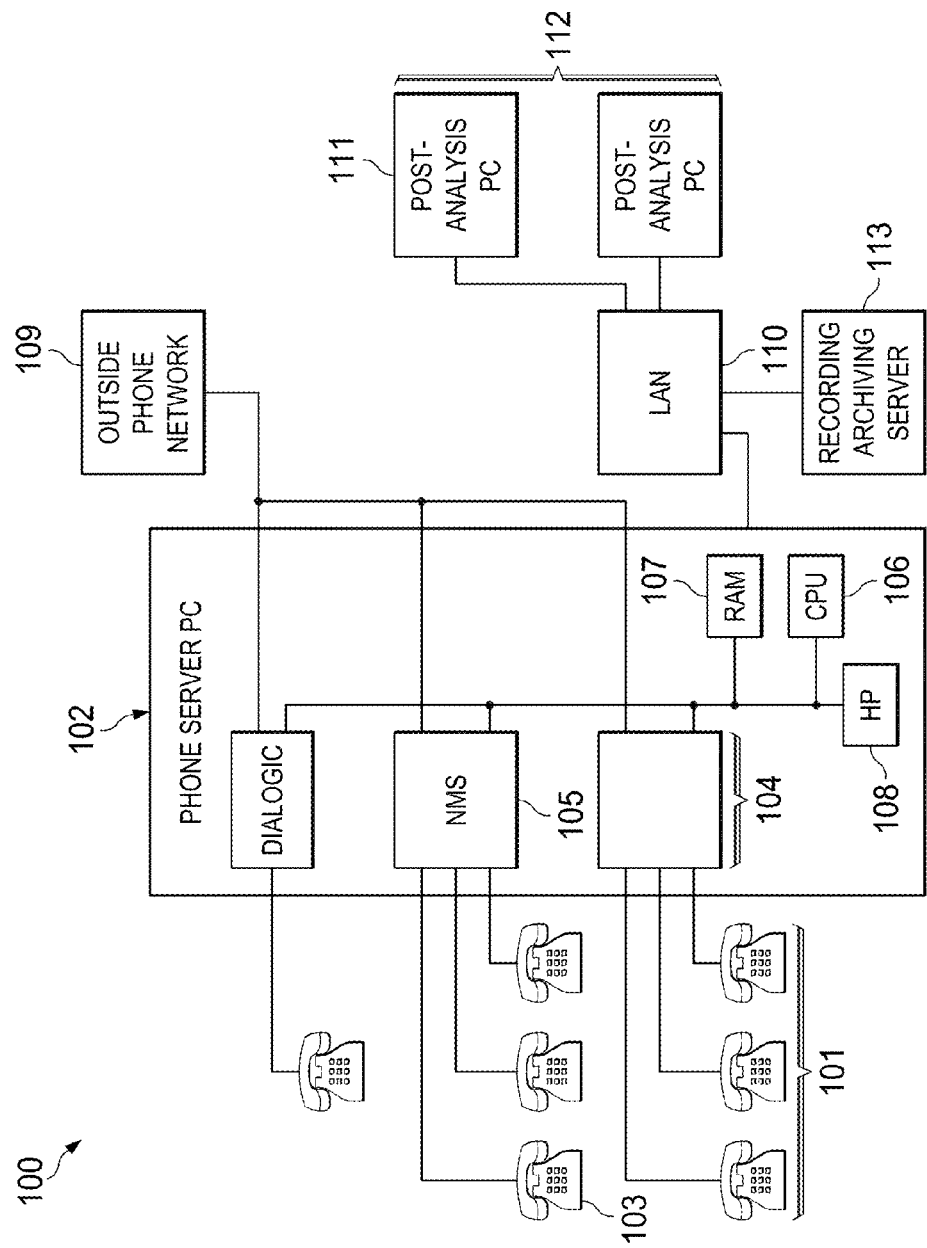
FIG. 1 is a block diagram of the hardware of the present invention.
Figure 2:
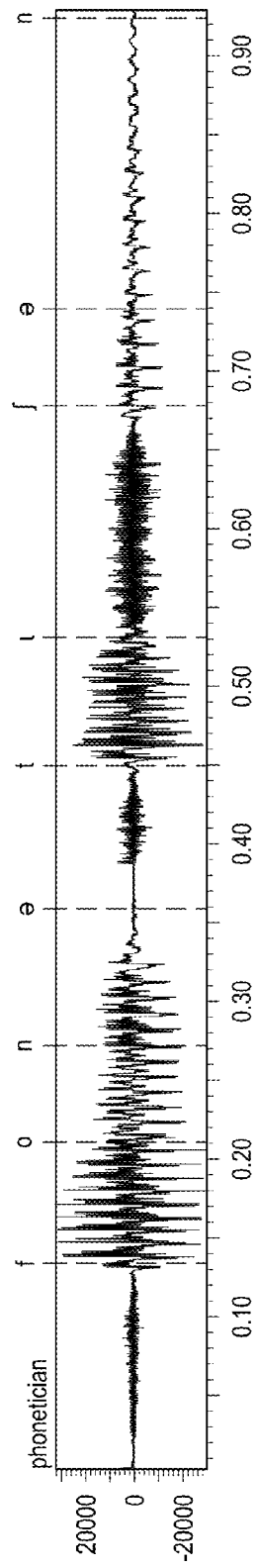
FIG. 2 is a time-domain representation of the acoustic waveform of the utterance "phonetician".
Figure 3:
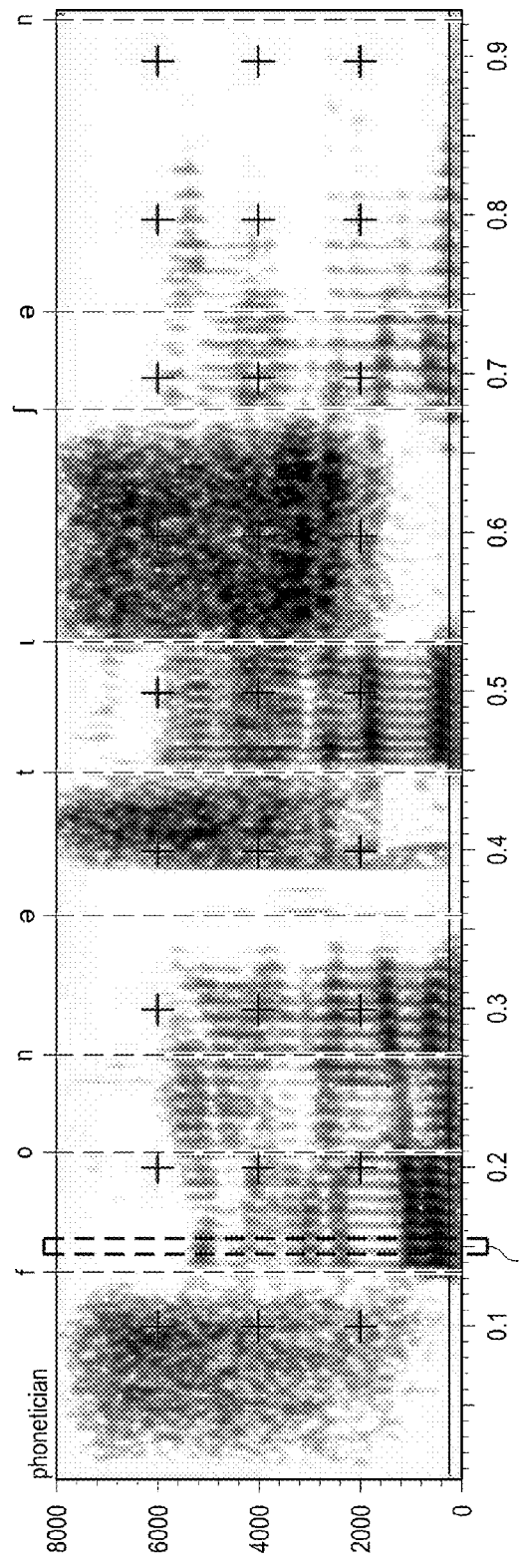
FIG. 3 is a spectrogram of the utterance "phonetician".
Figure 4:
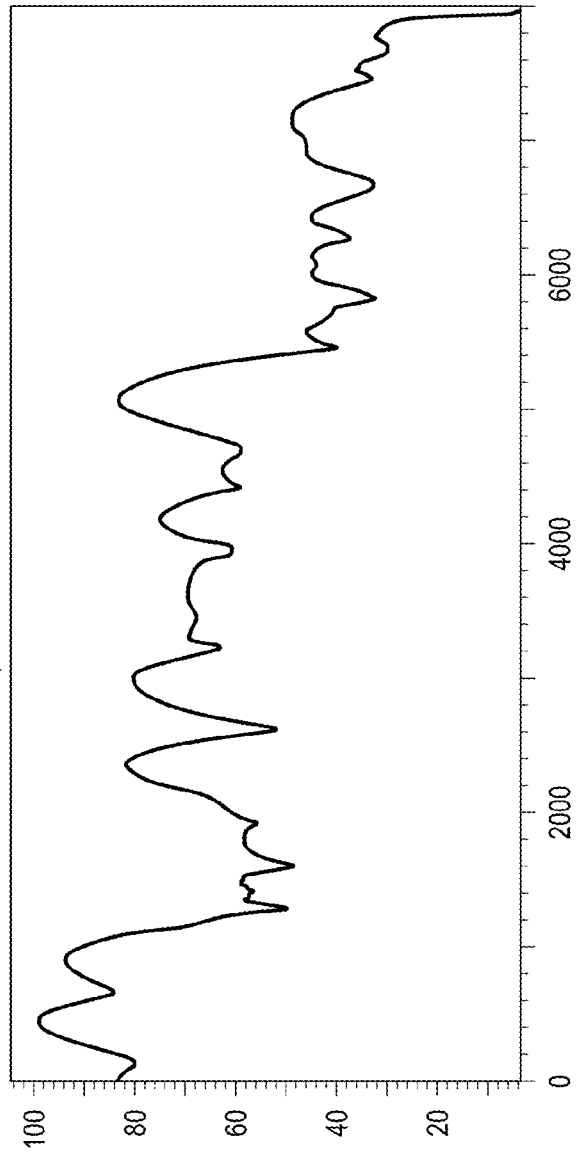
FIG. 4 depicts the frequency spectrum of the beginning of the "o" vowel during the utterance "phonetician".
Figure 5:
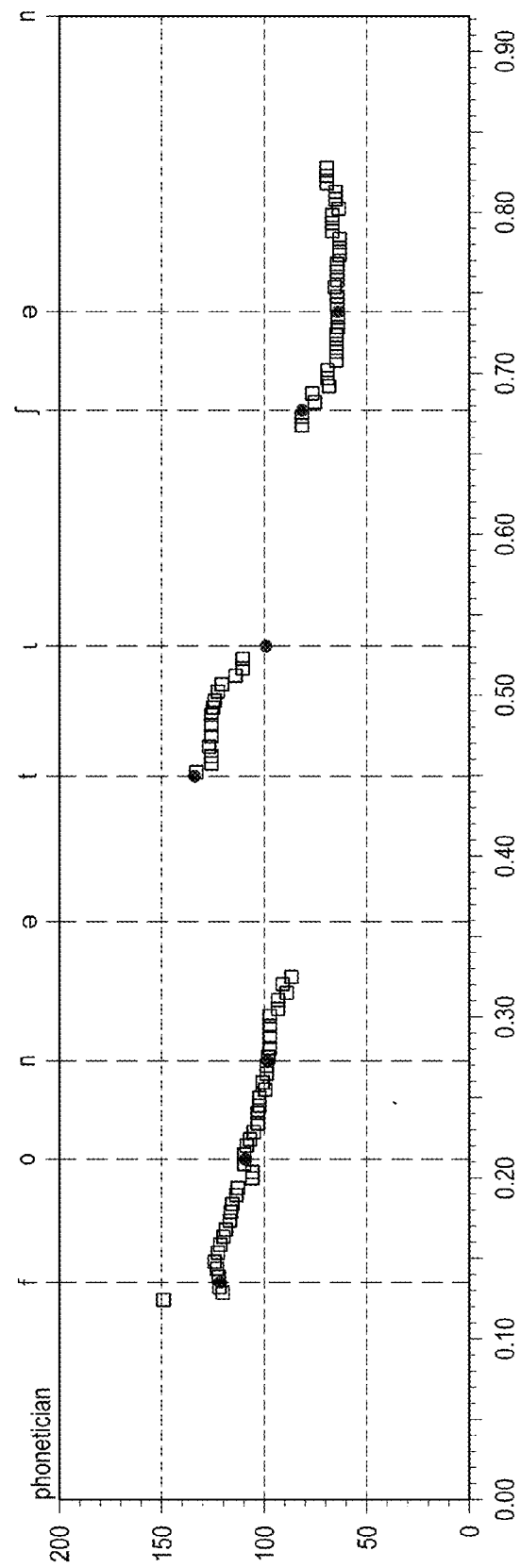
FIG. 5 is a graphical time-domain representation of the amplitude of the fundamental vibration mode of the speaker's vocal chords during the utterance "phonetician".
Figure 6:
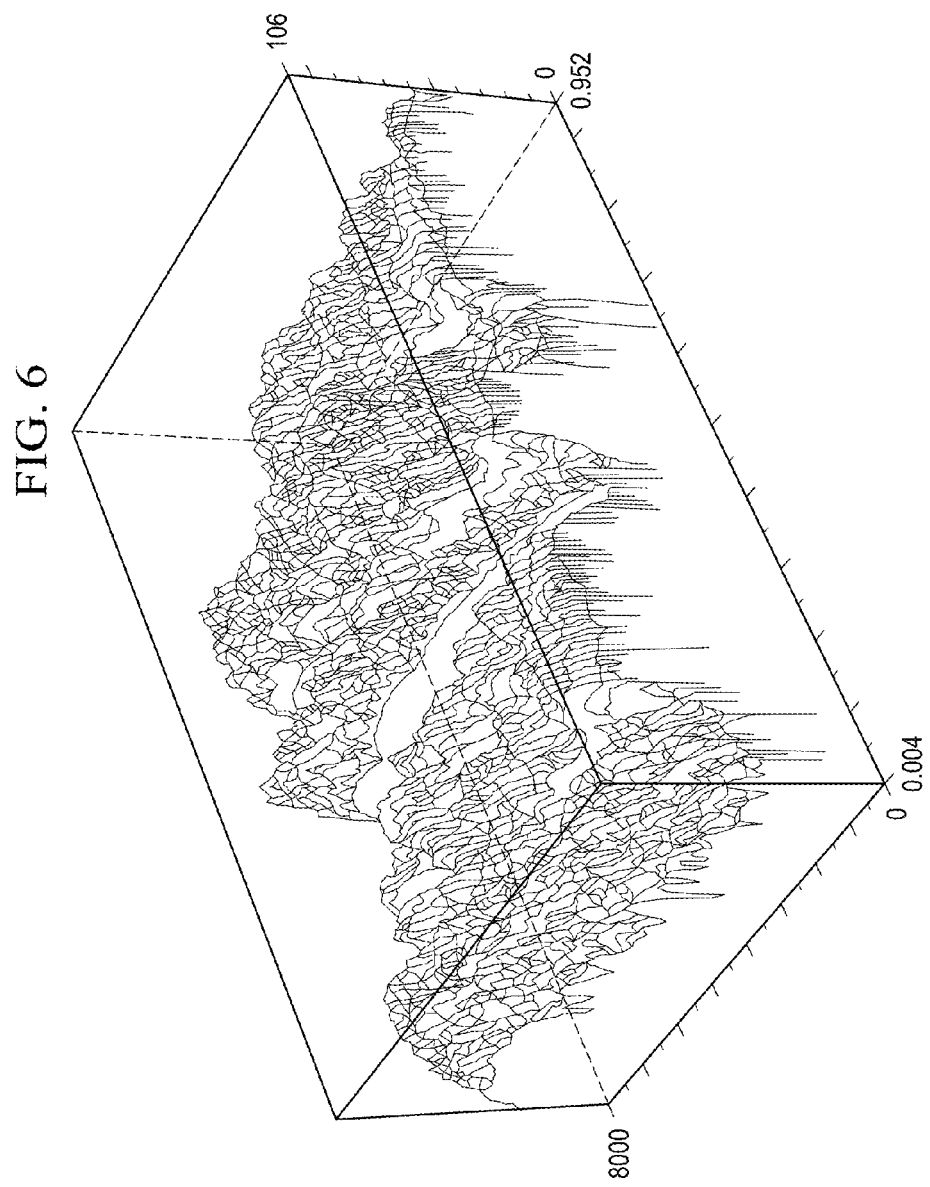
FIG. 6 is a perspective view of a three-dimensional spectrogram of the utterance "phonetician".

FIG. 1 is a block diagram of the hardware of a preferred embodiment of the present invention, as might be used within a prison phone system. In this embodiment, phone server 102 is implemented as a server PC with one or more phone cards 104 such as may be purchased from Natural Microsystems, Dialogic, Brooktrout Technologies, or Pika Technologies. In a preferred embodiment, much of the low-level computation done to extract voice parameters, etc. is done on DSP (digital signal processing) chips on board phone cards 104. Further processing and the creation of call summaries and call database entries is done by CPU 106. Both phone cards 104 and CPU 106 have direct access to RAM (random access memory) 107 and hard disk 108.

Figure 7:
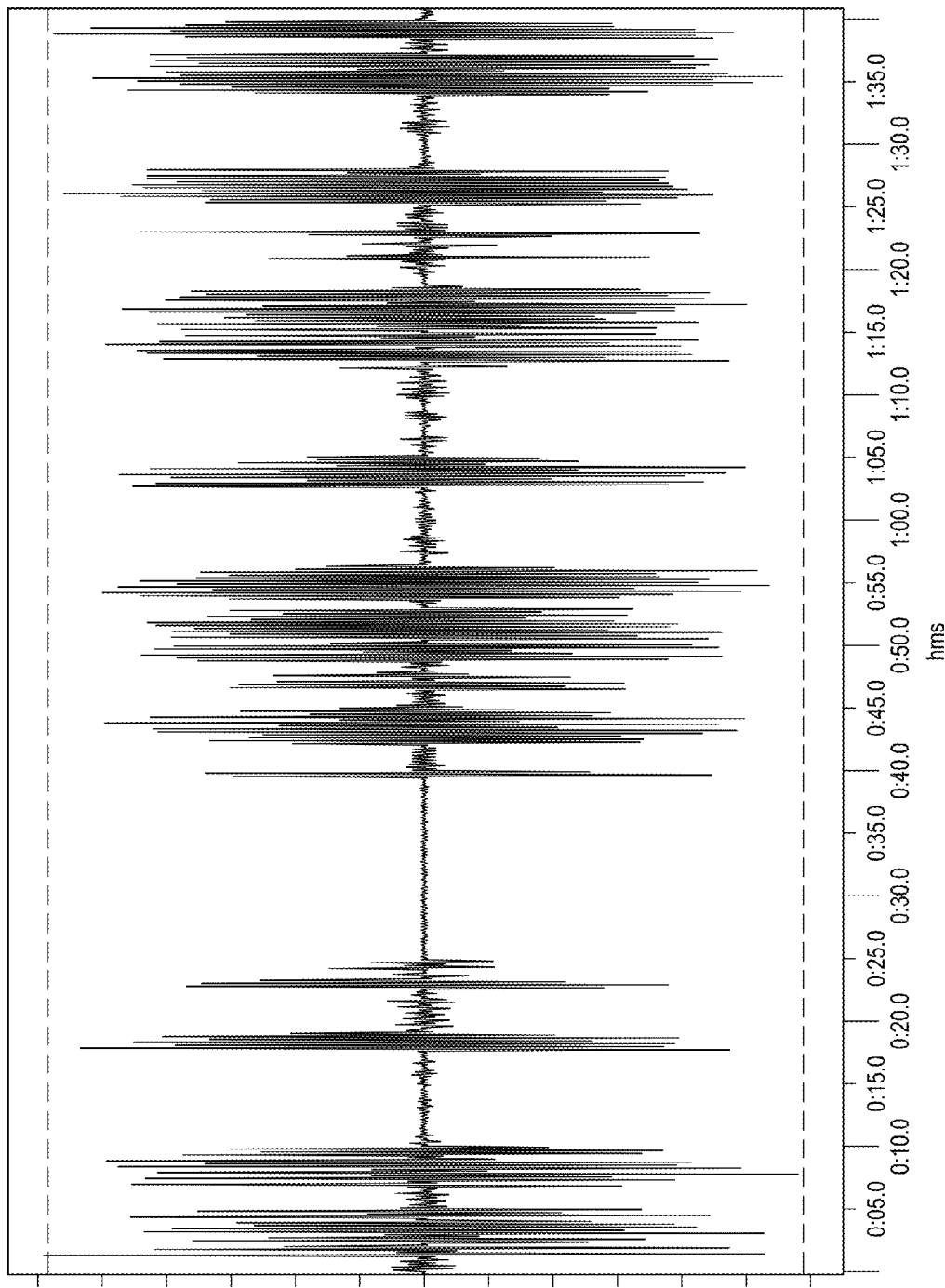
FIG. 7 is a time-domain waveform of a recorded call in which a called party conferences in a third party using 3-way calling. Call conferencing starts 24 seconds into this recording, and the third party who is conferenced in joins the conversation 66 seconds into the call.

FIG. 7 shows the time-domain waveform from a 100-second three way conversation, recorded from the phone of the person initiating the call. We will refer to three conversing parties in discussing this call: the calling party, the called party, and the third party. Table 1 below contains information about who was speaking during what periods of time in this three-way conversation. The first column indicates who was speaking for a given segment of the conversation. The second two columns contain the start and stop time (in seconds) of that segment of the conversation.

TABLE 1

|  | start | stop | Pause | Calling | Called | Third |
|---|---|---|---|---|---|---|
| Called party | 0.254 | 0.579 |  |  |  |  |
| Calling party | 1.176 | 4.874 | 0.597 | 0.597 | 0 | 0 |
| Called party | 4.874 | 6.965 | 0 | 0 | 0 | 0 |
| Calling party | 6.965 | 9.047 | 0 | 0 | 0 | 0 |
| Called party | 9.052 | 9.336 | 0.005 | 0 | 0.005 | 0 |
| Calling party | 9.389 | 9.995 | 0.053 | 0.053 | 0 | 0 |
| Called party | 10.224 | 17.4 | 0.229 | 0 | 0.229 | 0 |
| Calling party | 17.712 | 18.897 | 0.312 | 0.312 | 0 | 0 |
| Called party | 18.948 | 22.49 | 0.051 | 0 | 0.051 | 0 |
| Calling party | 22.605 | 23.347 | 0.115 | 0.115 | 0 | 0 |
| Called party | 23.347 | 23.634 | 0 | 0 | 0 | 0 |
| Calling party | 39.537 | 39.954 | 15.903 | 15.903 | 0 | 0 |
| Called party | 40.253 | 40.566 | 0.299 | 0 | 0.299 | 0 |
| Calling party | 42.181 | 45.32 | 1.615 | 1.615 | 0 | 0 |
| Called party | 45.424 | 45.88 | 0.104 | 0 | 0.104 | 0 |
| Calling party | 46.505 | 52.882 | 0.625 | 0.625 | 0 | 0 |
| Called party | 53.564 | 53.747 | 0.682 | 0 | 0.682 | 0 |
| Calling party | 53.747 | 56.404 | 0 | 0 | 0 | 0 |
| Called party | 56.599 | 62.681 | 0.195 | 0 | 0.195 | 0 |
| Calling party | 62.681 | 65.052 | 0 | 0 | 0 | 0 |
| Third party | 65.86 | 66.12 | 0.808 | 0 | 0 | 0.808 |
| Called party | 66.47 | 66.628 | 0.35 | 0 | 0.35 | 0 |
| Third party | 67.475 | 67.709 | 0.847 | 0 | 0 | 0.847 |
| Called party | 68.126 | 68.543 | 0.417 | 0 | 0.417 | 0 |

TABLE 1-continued

|  | start | stop | Pause | Calling | Called | Third |
|---|---|---|---|---|---|---|
| Third party | 69.467 | 69.571 | 0.924 | 0 | 0 | 0.924 |
| Called party | 69.819 | 72.554 | 0.248 | 0 | 0.248 | 0 |
| Calling party | 72.554 | 78.571 | 0 | 0 | 0 | 0 |
| Third party | 79.64 | 79.965 | 1.069 | 0 | 0 | 1.069 |
| Called party | 80.082 | 82.101 | 0.117 | 0 | 0.117 | 0 |
| Calling party | 82.726 | 83.169 | 0.625 | 0.625 | 0 | 0 |
| Called party | 83.169 | 85.279 | 0 | 0 | 0 | 0 |
| Calling party | 85.279 | 87.949 | 0 | 0 | 0 | 0 |
| Third party | 87.949 | 90.645 | 0 | 0 | 0 | 0 |
| Called party | 90.645 | 93.429 | 0 | 0 | 0 | 0 |
| Calling party | 93.793 | 97.258 | 0.364 | 0.364 | 0 | 0 |
| Called party | 97.401 | 98.339 | 0.143 | 0 | 0.143 | 0 |
| Calling party | 98.339 | 99.759 | 0 | 0 | 0 | 0 |
| Third party | 99.863 | 100.631 | 0.104 | 0 | 0 | 0.104 |

The fourth column represents the inter-speaker pause length. This is the time from when the previous person stopped speaking until the time the present person started speaking. The fifth, sixth, and seventh columns group the inter-speaker pause lengths, sorted by the speaker before who's speech the pause occurred.

Looking at the amplitudes of the signal in FIG. 7 during the time ranges indicated for the various speech segments in table 1, it can be seen that in this 16-bit-resolution recording, the typical amplitude of the speech signal from the calling party is about 20,000 least significant bits (LSBs) peak, and the typical amplitude of the speech signal from the called party is about 2,000 LSBs, and the typical amplitude of the speech signal from the third party is about 800 LSBs. A preferred embodiment of the present invention uses a multi-pass algorithm combining several techniques to identify who is speaking at any given time in the conversation. In a preferred embodiment, the first technique is channelizing (for instance by direction of communication on a four-wire telephone connection). The second technique may be sorting speech segments by channel characteristics (such as cell phone compression or spectral shaping indicative of a particular phone extension) or amplitude sorting (where speech segments are sorted by amplitude envelope, for instance, by RMS amplitude derived from a short sliding time window). The third technique is voice identification.

Figure 8:
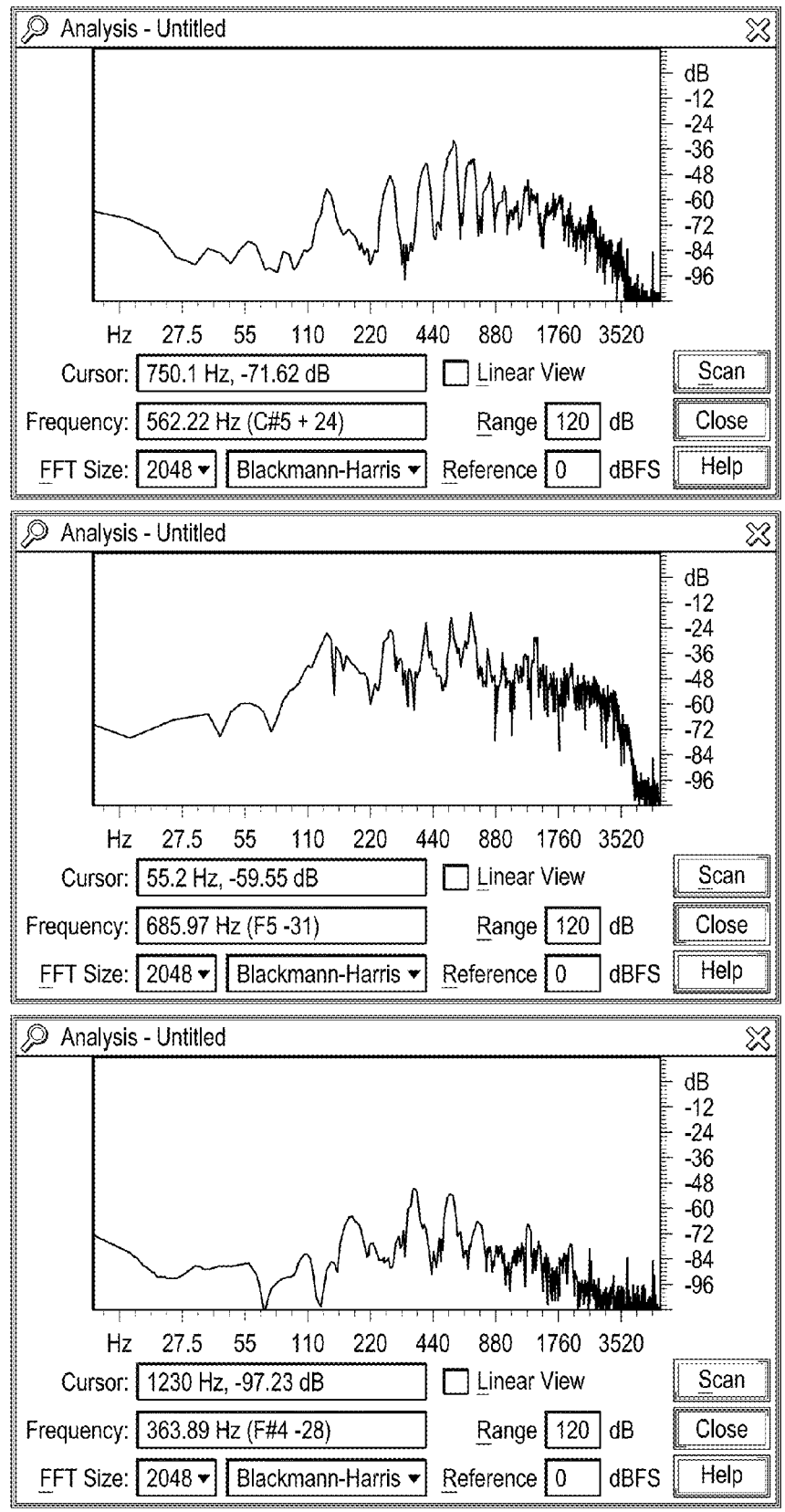
FIG. 8 is a comparison of the frequency spectrum during pronunciation of "o" vowels for the three participants in the call who's time domain waveform is shown in FIG. 7.
Figure 9:
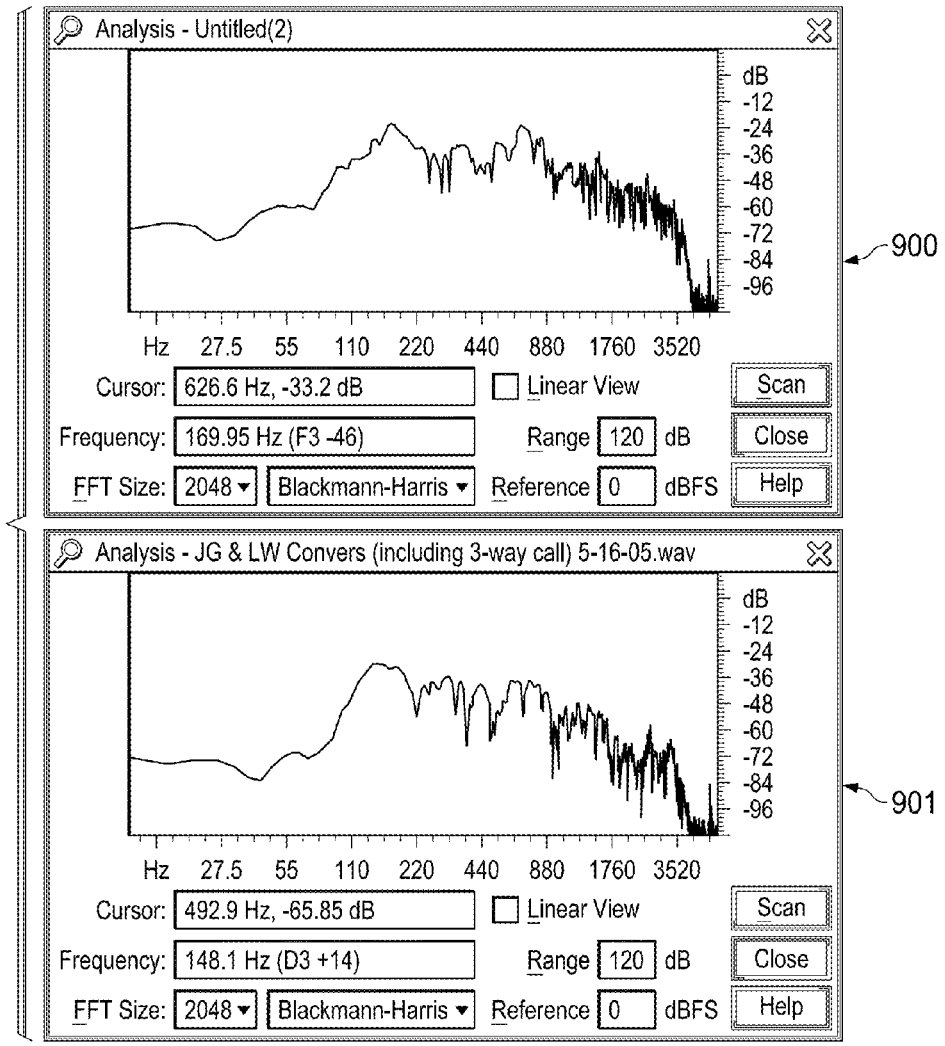
FIG. 9 is a comparison of the frequency spectrum of burst laughter from the calling party 901 and burst laughter from the called party 900 during the phone call who's time domain waveform is shown in FIG. 7.

FIG. 8 compares the spectrum of "o" vowel sounds from the three parties on the three-way call who's waveform is depicted in FIG. 7. The differences between the shapes of these spectra are illustrative of the spectrographic methods which the present invention employs to determine which speaker is speaking. In a preferred embodiment, if utterances are found who's spectral characteristics fall substantially outside the spectral characteristics expected given speech analyzed thus far in a conversation, it is assumed that a new participant has joined the conversation. As indicated above, signal amplitude information is used as another clue to when a new participant has joined the conversation.

A third way in which speech of different participants in a conversation is segmented in a preferred embodiment of the present invention is via channel quality characteristics which are found to be constant across speech segments from one conversation participant, but different between speech segments of different conversation participants.

The fourth way speech of different participants in a conversation is segmented in a preferred embodiment of the present invention is through telephonic directional separation of the signals from the two (or more) phones involved in the conversation. The hardware and software of phone cards 104 are able to separate signals originating from phones 101 (inside the facility served by the present invention) and signals coming from outside phone network 109. Thus, in a prison application, the hardware of phone cards 104 enable us to record in separate channels audio originating from the calling party's phone, and audio originating from called party phones, and spectral and amplitude information are utilized to differentiate between the voices of multiple parties participating on the call at one or more external locations through outside phone network 109. In a customer service application, audio from the customer service representative is preferably recorded in a separate channel from audio originating from called parties, and audio from multiple called parties may be segmented (diarized) using spectrographic and amplitude envelope techniques. In a preferred embodiment, once a conversation has been segmented (by person speaking) to a high degree of reliability, useful affective (emotional) labels are assigned to different segments of speech, and are available in either summary or graphical form. Additionally, statistics about pauses in the conversation are summarized. In an example call summary for a prison application of the present invention shown below, several parties are detected participating on the called-party side of the call. In this example, these parties are denoted "Called 1", "Called 2" and "Called 3", indicating they are unidentified parties on the called-party side of the line. The numerical suffixes indicate the order these called parties joined the call. If these parties voices had previously been enrolled, they would appear labeled by their names and/or photos, rather than unenrolled identifiers such as "Called 1". Hyperlinks can be provided for both enrolled and unenrolled participants, the clicking of which hyperlinks brings up a history of other calls the party has participated in. The example call summary is shown below:

Inmate #34566789
    Call Date: Apr. 5, 2005 Time: 13:42 Duration: 21 min
    Number of call participants: 4
    Joining times: Called 1=0:30, Called 2=0:45, Called 3=5:20
    Speaking durations:
        Caller=5:15, Called 1=0:05, Called 2=5:40, Called 3=12:10
    Emotions:
        Caller=10% happy, 50% sad, 5% angry, 10% calm, 3% excited, 15% formal, 20% calm, 5% angry
        Called 1=50% happy, 50% calm
        Called 2=50% formal, 50% calm, 10% angry
        Called 3=43% formal, 14% happy, 15% angry, 23% sad
        Hyperlink to emotion-indicating graphs from this call
    Inmate emotional trend over recent calls: happy increasing, formal increasing, angry decreasing, call time constant
        Hyperlink to emotional trend graphs
    Times recognized in the past:
        Called 1: 4, Called 2: 21, Called 3: 0
    Probability of 3-way call to another number: 75% (Called 3)
    Silent pause before first speaking:
        Called 2: 0:05, Called 3: 0:16
        Hyperlink to inter-speaker pause graphs
    Hyperlink to participant interactivity graphs The parties who participated in the above-summarized call (from outside the prison) are referred to in the above call summary as "Called 1", "Called 2", and "Called 3", designated in the order they joined the conversation.

Looking at the call summary above, prison officials can glean useful psychological information about the inmate who made the call by looking at either the emotional characterization of the inmates part of this particular conversation, or the emotional trend summary item (which is derived from looking across recent calls made by this inmate and mathematically extracting trend information by looking at whether the percentage of each emotion is on the average decreasing, increasing, remaining constant, or meeting other specified trend or statistical criteria). In alternate embodiments, the above call summary may be presented in the form of a hypertext document, where some statistics are represented by hyperlinks which expand to more detailed statistics upon being clicked, and more detailed graphical statistics may also be selectable by clicking hyperlinks. In an alternate embodiment, a checklist of possible statistics is presented, and officials can check off which statistics (including detailed graphics) they want to see in the summary, and then generate a custom summary based on the list of checked items.

In a preferred embodiment for use in prison systems, mental hospitals, and the like, inmate emotional trends are extracted from the facility's past archive of recorded phone calls and/or continually monitored on an ongoing basis by monitoring live phone calls over days, months, and years to provide long-term trend information that may be particularly useful in detecting changes in states of mind. Example trends that might be of interest in a correctional facility would include inmates becoming increasingly frustrated with their incarceration, inmates becoming increasingly accepting of their incarceration, and inmates becoming contemplative, who may therefore be open to new ways of thinking. Example trends which might be useful to detect in a treatment facility include changes in psychological state of mind which follow various treatments.

Another feature of the present invention for use in customer service applications provides an automatically generated real-time estimate of both customer emotional state and customer service representative emotional state. This feature serves both as an early warning system for potential problems, and a training aid to increase consciousness of customer service representatives.

In a preferred embodiment for use in prisons or mental institutions or the like, the present invention may be used to monitor not only phone conversations, but other conversations where individual inmate voices may be identified. For instance, inmate living quarters may be outfitted with microphone arrays, from which individual voices may be diarized or channelized based on the physical direction/location from which they were received by the microphone array. In addition, microphone directionality may be used to increases signal-to-noise ratio so that voice identification algorithms and speech-to-text algorithms may operate with reasonable reliability.

In a preferred embodiment for use in monitoring conversations in a space which may contain a significant number of persons (such as a cafeteria in a prison or mental institution), the present invention incorporates a multidimensional microphone array where audio streams from all microphones are individually digitized and stored for post-processing. In such an embodiment, array recordings may be processed multiple times to extract multiple conversations. Timing of speech segments coming from locations in the room in close proximity with each other may be grouped by lack of speech overlap, and closeness of interleaving, to derive conversational groupings of persons within the monitored area. In a preferred embodiment, multiple microphone arrays may be employed, and arrays with a sufficient number and quality of elements are used such that sufficient signal-to-noise ratio may be obtained that speech-to-text processing and speaker identification processing yield useful results.

In an embodiment intended for self-awareness training and social skill improvement, a wearable computer equipped with the present invention can (for instance, through a vibrating alarm) alert a user of a dangerous emotional escalation within a conversation. Other things that can be triggered to set an alert would be (for instance) frequently interrupting another person in conversation.

In a preferred embodiment for use in customer service applications, trends of increasing customer frustration (or satisfaction) are detected in real time during a given phone call, or across a series of phone calls. In addition, trends are extracted over a long period of time regarding each particular customer service agent, customer satisfaction graphs are generated, and early warning metrics are automatically extracted from long-term trends and used to help provide customer service agents any counseling and training they may need. In a preferred embodiment, the present invention provides immediate real-time graphical and/or audio and/or textual feedback to customer service representatives, allowing them to alter in the moment how they are interacting with customers. Real-time feedback can be a significant benefit in training, and may be used to alert supervisors when it may be beneficial to intervene in a call to preserve customer loyalty.

In an embodiment geared toward telemarketing, prosody patterns extracted from phone calls in real time are saved in a database, and later correlated with sales results to provide early indicators which can help telemarketers learn to apply more effective strategies, including cutting out wasted time on calls not statistically likely to result in a sale. A key feature of this aspect of the invention is that the call does not have to be recorded to accomplish this function, so no recording announcement need be made to people being called.

In a preferred embodiment of the present invention for use in telemarketing, the results from the call (for instance, sales made, future calls set up, comments or survey results from the telemarketer or called party) are stored in a relational database along with the audio from the call and data extracted from the audio (such as diarization data, text derived from speech, prosody information derived from speech, linguistic pattern information, etc.) and certainty levels with which derived data is believed to be accurate, and techniques such as neural networks, Markov models, hidden Markov models, etc. are used on the derived data to develop models of what makes a successful call successful, and what makes an unsuccessful call unsuccessful. In a preferred embodiment, these models are extracted and usable for training purposes. In a preferred embodiment, these models are also used in conjunction with live monitoring of calls to automatically provide real-time feedback to telemarketers to help increase the effectiveness of their calls. As an example which demonstrates how sales effectiveness can be increased through training in interaction style and consciousness not to make self-defeating snap judgments, the reader may benefit from reading the "Taking Care of the Customer" section of the book "Blink: The Power of Thinking Without Thinking" by Malcolm Gladwell (pages 88-93), which are herein incorporated by reference.

In an embodiment geared toward financial institutions, voice characterization records are kept to alert financial institutions when someone other than the intended customer is reached at the customer's phone number, and records are automatically kept of when a third party joins a call. In a preferred embodiment, this is done without recording the call, so no recording announcement need be made. In a preferred embodiment utilizing biometric verification of customer identity, ongoing voice verification is automatically done on the customer's end of the conversation, and an alert is automatically provided to the customer service representative if the person speaking to the customer service representative changes to a different person than the person who originally passed the biometric verification test. Ongoing voice verification in such application aids in prevention of fraud, by preventing such things as a caller using a recording of another person to pass a voice verification test, and then conduct an unauthorized financial transaction in their own voice.

Another statistic immediately useful is the likelihood that a three-way call to another telephone number took place. The present invention allows this statistic to be derived in a number of ways. The first way this statistic may be derived is by looking at the amount of silence time on the inbound side of the call prior to speech by a party other than the first party to answer, combined with other factors, including a lack of increased perceived loudness on the part of the called party just prior to that silence time. An increase in perceived loudness (even when there is a decrease in absolute loudness) on the part of the called party who spoke just prior to the silence time may indicate that one party at the called phone number is yelling for another person to join the call. This may be common in a called residence where more than one person lives. In instances where some of the voices of called parties are enrolled voices and at least one voice is a non-enrolled voice, this may provide further evidence of a three-way call. Another indication of a three-way call according to the present invention is the appearance of different speech segments from the called-party side of the line where the different speech segments show artifacts of two different speech compression techniques (for instance, one type of cell phone compression for one speech segment, and no compression for another speech segment). Another indication of a three-way call may be the presence of speech segments with frequency shaping characteristics that indicate that speech from more than one telephone extension is present.

In a preferred embodiment, detecting high probability of a three-way call, along with detecting with reasonable probability that an unauthorized voice is on the line, triggers semi-automated voice enrollment, where the new party is asked to identify himself or herself. In a preferred embodiment, the called party will be asked to verbally verify and/or approve the enrolment of the new party. In an alternate preferred embodiment, the call may be recorded and flagged for later review, or the call may be interrupted and an official may join the conversation to verify that the party who joined the conversation is authorized.

In an alternate preferred embodiment with stricter conversation participant identification criteria, when a conversation participant with an unrecognized voice is detected, the system automatically interrupts the conversation and the new conversation participant is directed to call an enrolment number within a specified short period of time to enroll his or her voice. This is done to determine a likely phone number of the newly enrolling person, to aid in identity verification and/or future contactability. In a preferred embodiment, if the call in progress must be interrupted for the unidentified participant to call in and enroll, the inmate is automatically notified as soon as such enrolment has been completed, so that he may place the call again. A preferred embodiment of the present invention is capable of putting the inmate on hold, and connecting the called party directly to a customer service center and then can reconnect the inmate to the called party.

Figure 10:
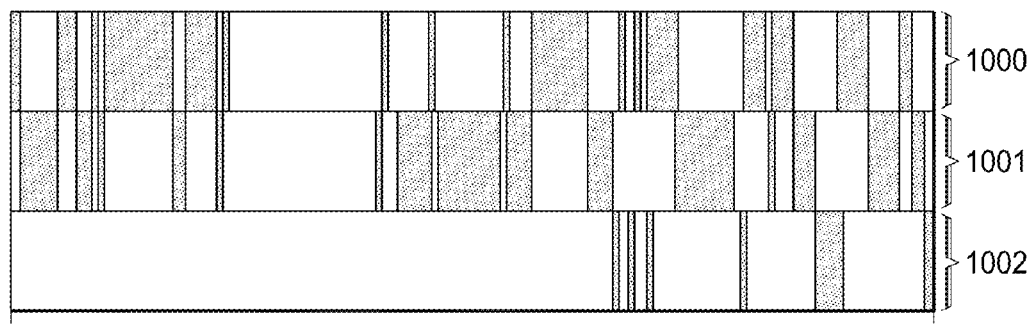
FIG. 10 is a speaking time graph (segmented by participant) of the phone call who's time-domain waveform is shown in FIG. 7. The black areas indicate when a participant is speaking. The upper stripe 1000 represents the speech of the called party. The middle stripe 1001 represents the speech of the calling party. The lower stripe 1002 represents the speech of the third party.

In a preferred embodiment, one graphical representation of the conversation which would be available for display would be a speaking time graph such as the one shown in FIG. 10. FIG. 10 is a speaking time graph (segmented by participant) of the phone call who's time-domain waveform is shown in FIG. 7. The black areas indicate when a participant is speaking. The upper stripe 1000 represents the speech of the called party. The middle stripe 1001 represents the speech of the calling party. The lower stripe 1002 represents the speech of the third party. In a color version of such a speaking time graph, the three horizontal stripes may be combined into one, and speech segments of different conversational participants may be indicated in different colors. Such a combined graph makes the lengths of inter-speaker pauses in conversation more visually apparent.

Figure 11:
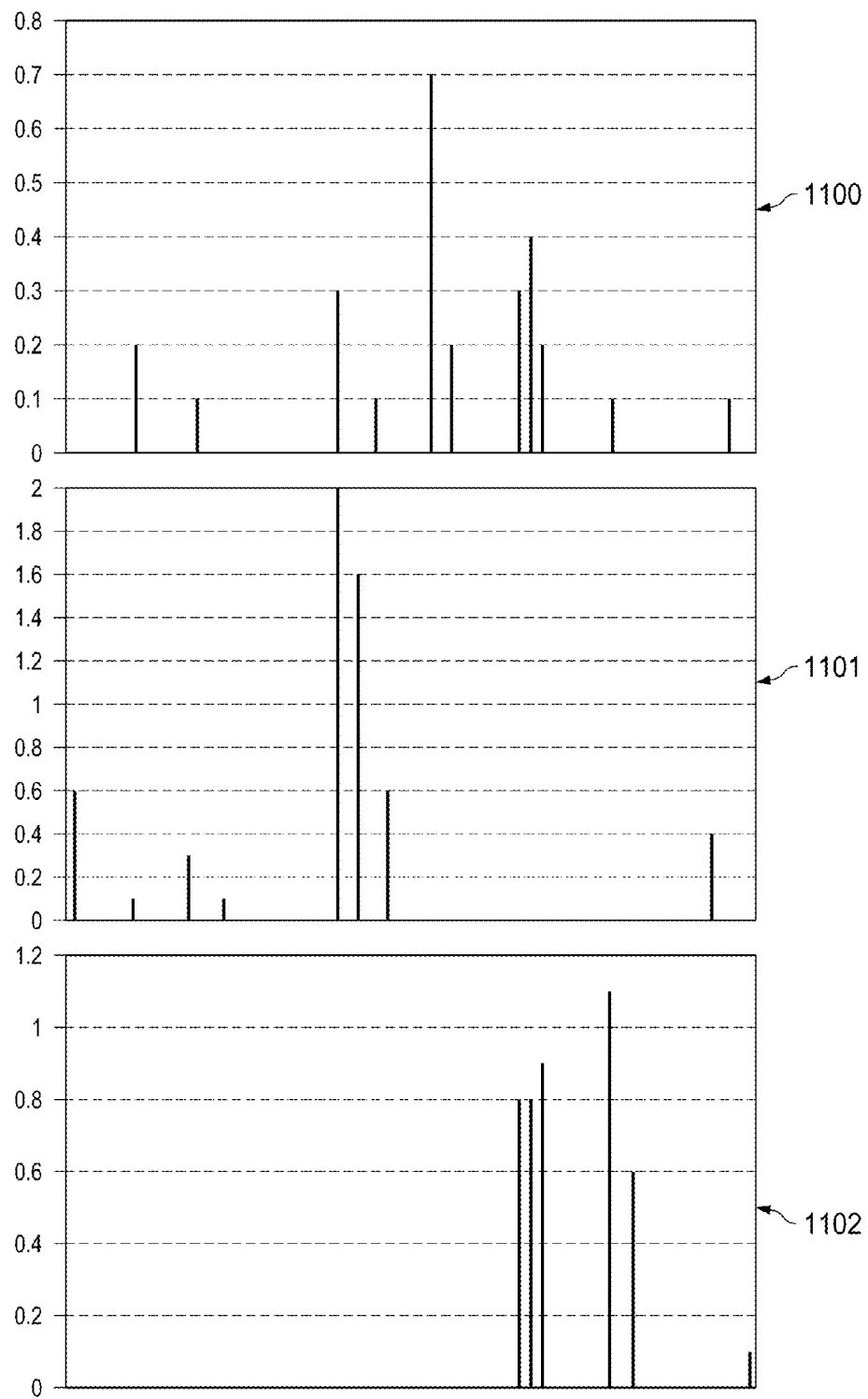
FIG. 11 is a set of pause graphs extracted from the phone call who's time domain waveform is shown in FIG. 7. Each vertical bar in the graphs represents the interval of time between when the most recent other participant finished speaking and the time when the present participant started speaking. Upper graph 1100 represents pauses before speaking of the called party. Middle graph 1101 represents (clipped) pauses before speaking of the calling party. Lower graph 1102 represents pauses before speaking of the third party.

In a preferred embodiment, another set of statistical information about the conversation which would be available for graphical display would be the inter-speaker pause graphs depicted (separated by participant) in FIG. 11. FIG. 11 is a set of pause graphs extracted from the phone call who's time domain waveform is shown in FIG. 7. Each vertical bar in the graphs represents the interval of time between when the most recent other participant finished speaking and the time when the present participant started speaking. Such information may be used to estimate reactiveness vs. responsiveness, etc. Upper graph 1100 represents pauses before speaking of the called party. Middle graph 1101 represents (clipped) pauses before speaking of the calling party. (The pause who's bar on the graph is clipped is a very long pause due to the conferencing in of a third party via three-way calling, and the graph has been presented in clipped form to preserve resolution in displaying the shorter pauses on the graph.) Lower graph 1102 represents pauses before speaking of the third party. Alternately an inter-speaker pause graph may be used which has negative spikes for all inter-speaker pauses shorter than a pre-determined amount (to be used, for instance, as an aid to detecting reactive rather than responsive speech).

Inter-speaker pause graphs such as those of FIG. 11 can provide valuable information in both customer service applications and prison applications of the present invention, because pausing before speaking is a good indication of contemplation. Thus "reactive" answers to questions can be distinguished from "thoughtful" or "responsive" answers to questions. In a preferred embodiment of the present invention, inter-speaker pause measurements are combined with emotional measurements of speech (of one speaker just before the pause, and the other speaker just after each pause), to indicate a number of likely types of conversation, such as "helpful", "sympathetic", "antagonistic", "defensive", "contemplative", "argumentative", "threatening", and "giving and taking orders".

Figure 13:
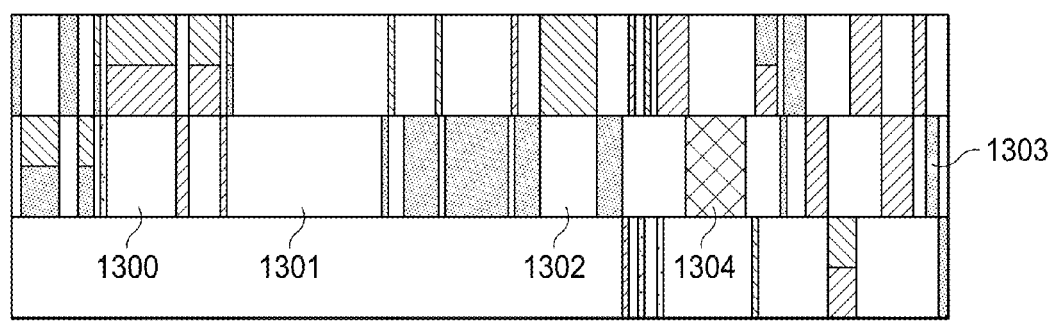
FIG. 13 is the speaking graph of FIG. 10 with additional prosody information encoded through the use of crosshatching. The emotions happy, formal, excited, and calm are indicated by the patterns of diagonal lines, dark gray, crossed lines, and white, respectively. Blank time is represented by light gray.

In a preferred embodiment, one selectable method for displaying the emotional character of a conversation is to indicate emotions through the use of color or crosshatching patterns in a speaking time graph, such as the speaking time and emotion graph depicted in FIG. 13. FIG. 13 is the speaking graph of FIG. 10 with additional prosody information encoded through the use of crosshatching patterns. The emotions happy, formal, excited, and calm are indicated by the patterns of diagonal lines, dark gray, crossed lines, and white, respectively. Blank time is represented by light gray. When two emotions are simultaneously detected in a given speech segment, the graphical bar representing that speech segment is represented by a dual-color (or dual-pattern) bar.

In a preferred embodiment, conversational segments are characterized not only by prosody, but text derived from speech-to-text conversion is also used (sometimes in conjunction with analysis of adjoining segments from another conversational participant) to characterize conversational segments in additional ways. For instance, conversational segments likely to be part of an argument or threat are automatically recognized, questions are automatically recognized both through prosody, and through speech-to-text combined with grammatical analysis), and in conversations with more than two participants, any specific person being spoken to in a given segment is also identified (for instance, by name used, or subject being responded to). In a preferred embodiment, a training feature allows conversational segments (or segment pairs) of a flexibly definable type (involving a specific individual or a number of individuals) to be extracted from a conversation database and concatenated into contiguously playable audio stream so that persons being trained may hear many examples in a row. For instance a query could be done to extract all conversations in which customer service representative John interrupted customers, and where the issue the customer called about was not resolved. John could then hear a multitude of conversational segments where he interrupted customers, and this would enable him to build an awareness of the type of situations he might like to become more conscious of in his future conversations.

Figure 12:
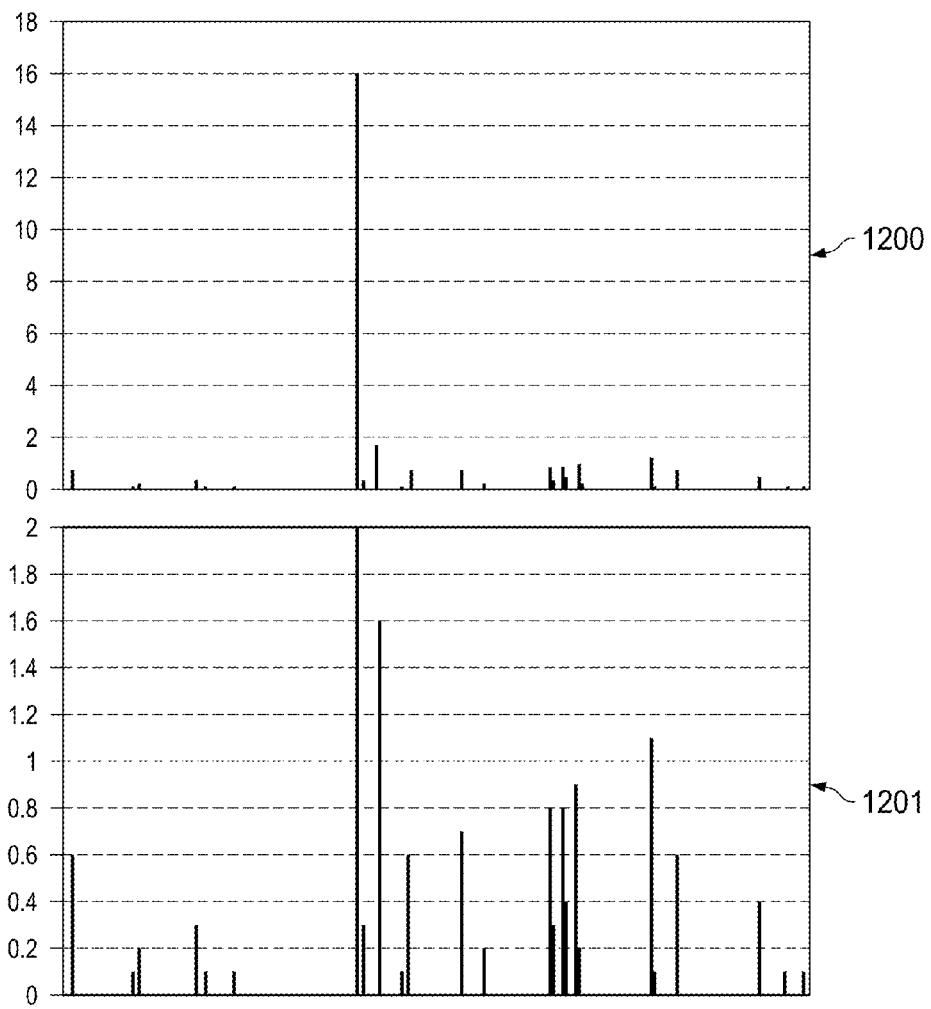
FIG. 12 shows an un-clipped composite pause graph 1200 and a clipped composite pause graph 1201 for the phone call who's time domain waveform is shown in FIG. 7. Each vertical bar in the graphs represents the interval of time between when the most recent other participant finished speaking and the time when the present participant started speaking.

The use of different colors to represent different emotions in user interfaces such as depicted in FIG. 13 makes for a useful graphical emotional summary of a conversation, but it can be difficult to read for a specific emotion, especially if it is desirable to quantify that emotion to more than one bit of resolution. An alternate method which a preferred embodiment of the present invention provides for representing single emotions throughout a conversation is an emotional bar (for a particular emotion) in the style of the pause graphs of FIG. 11 (which are separated by participant), or in the style of the pause graphs of FIG. 12 (in which emotion bar graphs would be combined for all participants in a conversation, and participants would be indicated by different colors on the same graph).

In another aspect, the time-correlated and speaker-correlated nature of the prosody information stored in the conversation database of the present invention allows a conversation reviewer to search for temporal/emotional patterns in a conversation (for instance "find the first time that John responded to Mary angrily", or "find the first time in the conversation when John spoke with a high apparent loudness to Mary and she responded with a sad emotional tone). The present invention provides a novel graphical user interface which enables someone reviewing a recorded conversation to jump to a specific part of the conversation which may be of interest. An example of such an interface is shown in FIG. 18.

Figure 18:
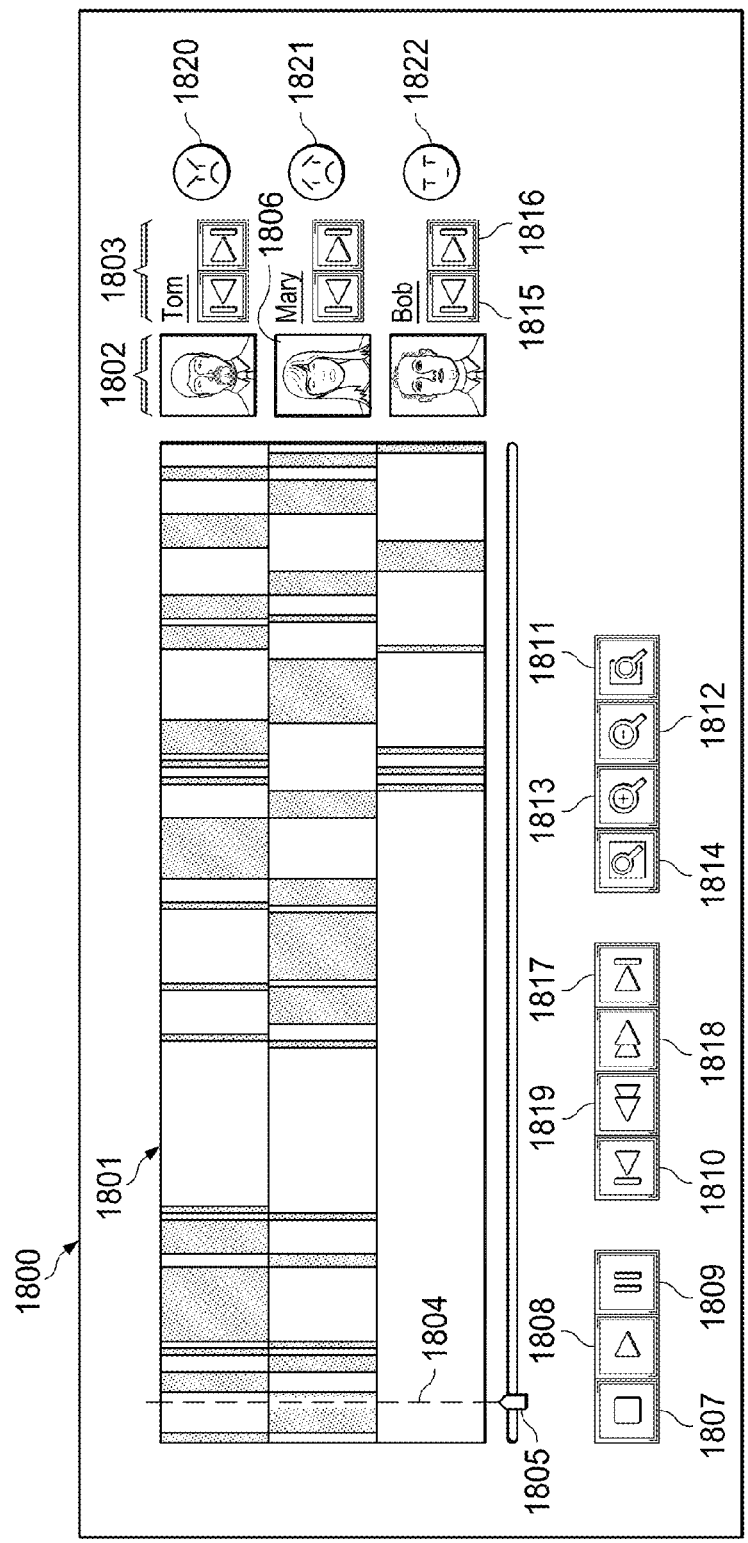
FIG. 18 is a graphical user interface for reviewing conversations according to one aspect of the present invention.
Figure 19:
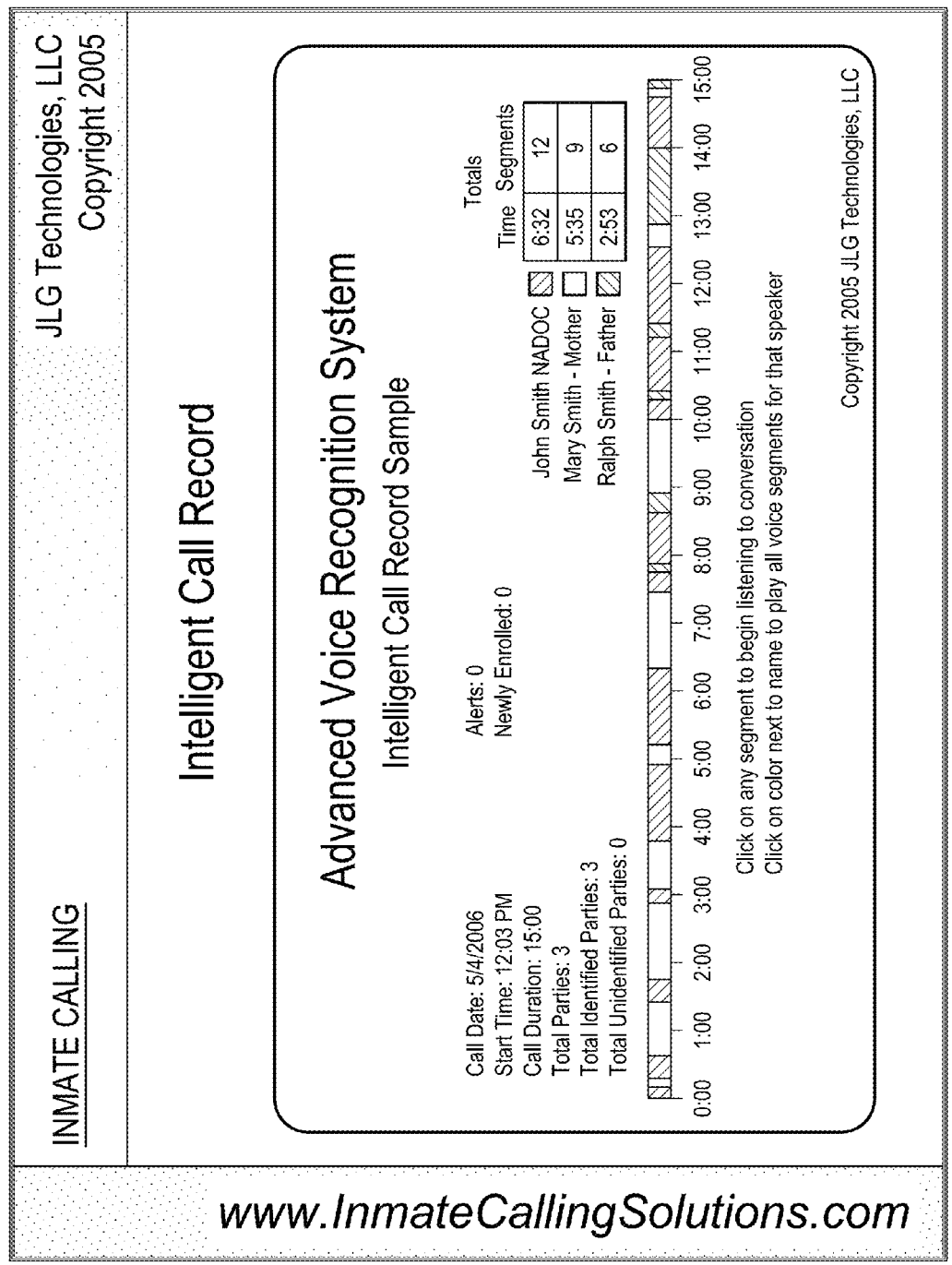
FIG. 19 depicts an example graphical user interface for call review in a preferred embodiment of the present invention for use in correctional institutions.

Speaking graph 1801 within FIG. 18 is similar to speaking graph 10, but is part of an interactive interface. Time slider 1805 may be moved by clicking and dragging with a standard computer interface such as a mouse, and time pointer 1804 shows the alignment of time slider 1805 with the various audio segments of the conversation spoken by the various individuals who took part in the conversation (in this case, Tom, Mary, and Bob). Emotionally symbolic graphical face symbols 1820, 1821, and 1822 represent the emotions detected most recently in the voices of Tom, Mary, and Bob respectively at the point in the conversation where time slider 1805 is positioned. In a preferred embodiment, someone reviewing the conversation can slide time slider 1805 along the time line of the conversation, and as the slider is moved through the time of the call, emotionally indicative icons (emoticons) 1820, 1821, and 1822 change in an animated way to indicate the emotions of each of the participants on the call correlated with the conversation reviewer moving of the time slider along the timeline of the conversation. This dynamic interface of the present invention allows people with little training to intuitively quickly get a feel for how the emotional states of the people on the call changed throughout the call.

Figure 15:
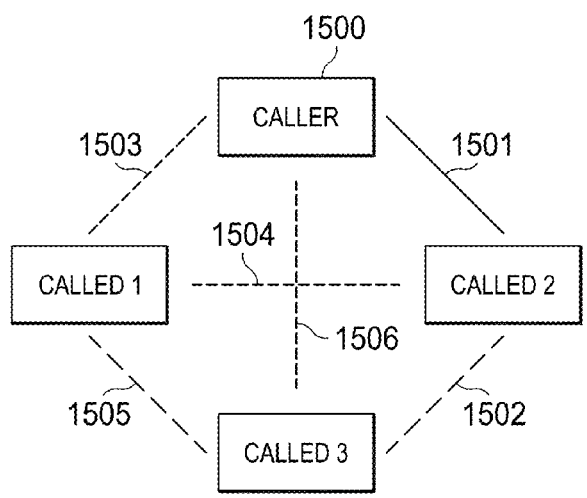
FIG. 15 depicts paired dialog weighting in a four-party call. Each line connecting two parties is weighted proportionately to the fraction of call dialog which took place between the two parties joined by the line.
Figure 16:
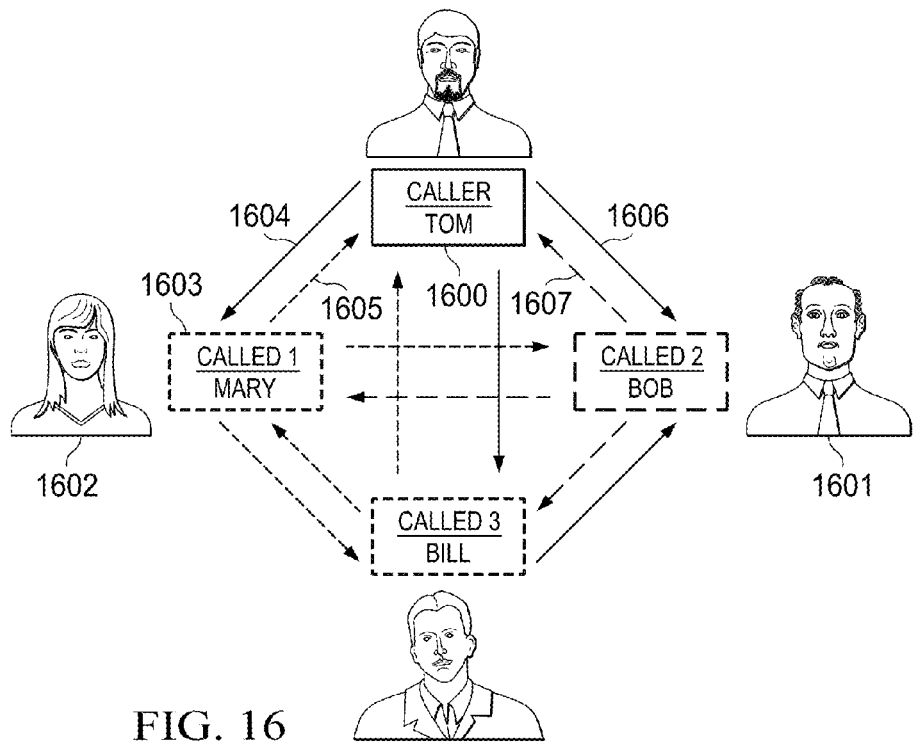
FIG. 16 is a conversation-centric graphical display of interactions within a conversation according to one aspect of the present invention.
Figure 17:
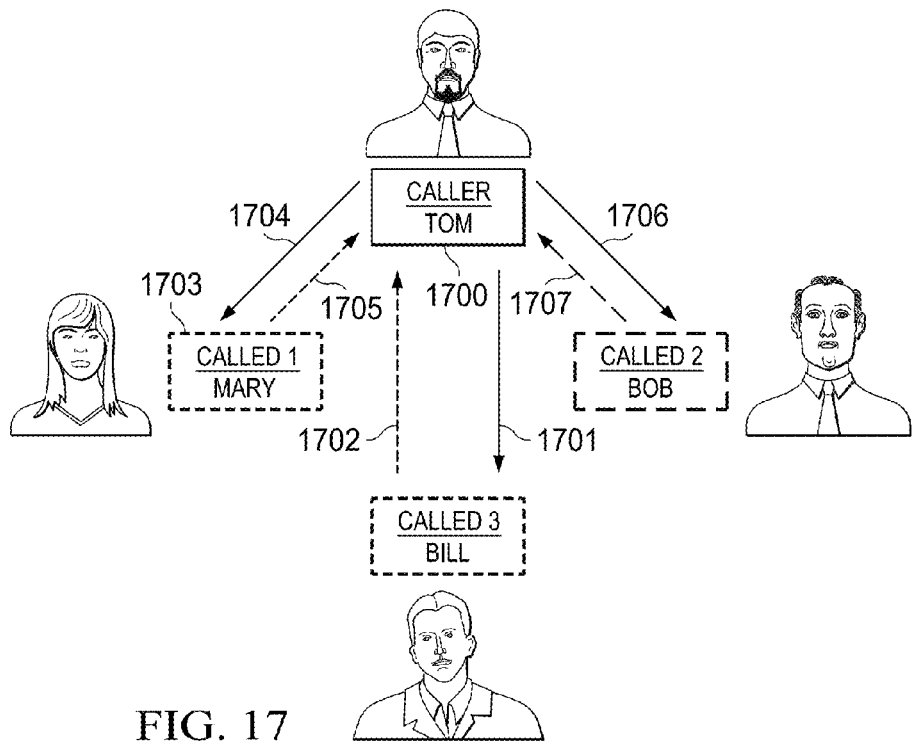
FIG. 17 is a person-centric graphical display of interactions within a conversation according to one aspect of the present invention.

In another aspect, the present invention provides a number of novel graphical displays which a person reviewing a recorded conversation may use to glean summary information about the conversation. Examples of such graphical displays are shown in FIGS. 15, 16, and 17. FIG. 15 provides a pictorial representation of who talked to who what fraction of the time within a particular recorded conversation. FIG. 15 represents a call with four participants (a calling party, and three called parties). Each line connecting two parties is weighted proportionately to the fraction of call dialog which took place between the two parties joined by the line. In an embodiment for use in analyzing inmate phone calls, such a pictorial representation of paired dialog can aid officials in guessing who knows who on a call in which more than two participants participate.

Figure 14:
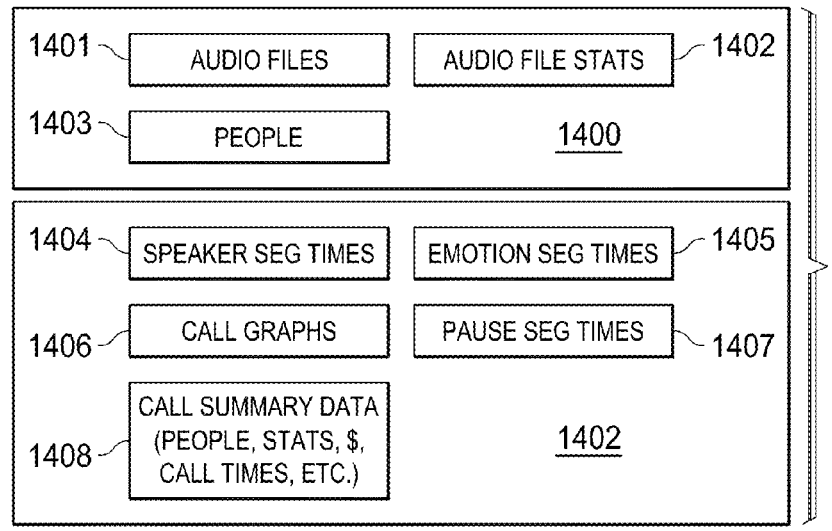
FIG. 14 depicts some of the structure of the conversation database contained within Recording Archiving Server 113 in a preferred embodiment of the present invention.

FIG. 14 depicts some of the structure of the conversation database 1400 contained within Conversation Database Server 113 in a preferred embodiment of the present invention. In a preferred embodiment, conversation database 1400 is a relational database containing audio file table 1401 (which contains the recorded audio files, in raw and/or compressed form), participant table 1403 (containing information known about different people who have participated in the calls in audio files table 1401, including names, phone numbers, addresses, voice signature data, etc), and audio files statistics table 1402. In a preferred embodiment, audio file statistics table 1401 contains speaker segment times data 1404 (indicating the spans of time during a particular audio file during which each person spoke), pause segment times data 1407 (indicating the time segments of a particular audio file during which no one was speaking), emotional segment times data 1405 (indicating the time segments during a particular call when various emotions were detected from conversation participants' speech, with tags indicating who was speaking), derived call graphs data 1406 (extracted from calls by post-processing, and then stored for rapid display), and call summary data.

In a preferred embodiment of the present invention incorporating speech-to-text conversion, clicking on a particular graphical symbol which represents a speech segment within a conversation may be configured to display all converted text of that segment of the conversation, or play that audio segment of the conversation, or both. In such an embodiment any corrections done to the converted text by persons viewing the text and listening to the audio from the conversation may be used to enhance the accuracy of further speech-to-text conversions performed for that conversation participant's speech. In a preferred embodiment, date and time of manual correction (along with identifying information of persons performing manual corrections) are stored in the conversation database for all manual corrections made to any previously automatically derived or manually entered or previously manually corrected data.

In a preferred embodiment of the present invention, all conversational attribute data derived by the system (such as the identity of who is speaking at a given time in a conversation, or what emotion is present in a given speech segment, what speech mannerisms are detected, where speech mannerisms indicate that a person is from, whether a conversation is confrontational, friendly, etc.) is stored in such a manner that certainty-level (probability) information is stored along with the derived data in the database, and alternate possible derived data variations and their estimated probabilities may also be stored. In a preferred embodiment, this certainty-level information can be displayed as a color coding or shading on a graphical interface such as the one in FIG. 18. In such an embodiment, the dark bands of talking graph 1801 would be different colors (different shades of gray, or would appear with different levels of opacity), depending on how "certain" the system was of which person was speaking during that segment of the conversation. Also in such an embodiment, emoticons 1820, 1821, and 1822 would be shaded with different colors, representing the certainty level the system had that the emotion being displayed on a graphical face symbol was representative of the emotional state of the person speaking at that point in time.

In a preferred embodiment of the present invention incorporating speech-to-text conversion certainty levels of each converted word are stored in database 1400 along with the converted text. In addition in a preferred embodiment, in cases where converted word certainty is not high, alternate words and/or phrases and their estimated probabilities of correctness are also stored in the database.

FIG. 15 is an example of one of the visual displays of the present invention which is designed to quickly give insight into the nature of a conversation between more than two (in this case four) participants. FIG. 15 depicts paired dialog weighting in a four-party call. Each line connecting two parties is weighted proportionately to the fraction of call dialog which took place between the two parties joined by the line. This type of graphical presentation can be particularly useful in conveying conversational dynamics in applications such as business meetings, coaching sessions, family interactions, etc., and can be used to provide real-time as well as delayed feedback.

In a preferred embodiment of the present invention for use in prison phone systems, voice signature data is stored both for inmates, and for the parties those inmates are allowed to contact, and the system can be configured either to automatically disconnect calls in which un-allowed voices are detected, or to alert corrections officers, who can then listen to the call and determine whether to disconnect the call. In a preferred embodiment, when prison officials elect to listen in on a call, a graphical user interface allows them to start listening to the call live, or to begin their listening at any point in time previous to when the alert was generated. Thus, when an un-allowed voice is detected on the call and an alert is generated, prison officials may begin their listening (for instance) 30 seconds earlier in time than when the alert was generated. In a preferred embodiment, the features of the conversation-reviewing interfaces shown in FIGS. 10, 11, 12, 13, 16, 17, and 18 are available in real-time as a call is going on, so that prison officials can quickly gain a feel for key aspects (such as how many people have participated in the call so far, what prosody aspects of their speech have been detected, etc.) of a call in progress as they begin to listen in on the call. This same real-time feature of the present invention is also useful in the customer service industry, allowing supervisors to get a feel for how a customer service call in progress has gone prior to a customer service supervisor coming onto the line.

In a preferred embodiment of the present invention for use in prison phone systems, an automatic, semi-automatic or supervised enrollment process allows for voice signature data of inmates and called parties to be stored in people database 1403.

In a typical supervised enrolment example, an inmate wishing to place a call would enter non-private identifying information (such as inmate number) via the telephone keypad. A corrections officer would then verify the identity of the inmate, and the inmate would speak his name and ID number into a telephone. Additionally, the inmate would likely be prompted to key and private identifying information such as PIN number, credit card number, or debit card number, enabling proper billing of the phone call. Subsequently, each time that inmate placed a telephone call, he would begin by speaking his name and ID number. In a preferred embodiment, If the system subsequently detected on the prison side of that call a voice which was not that inmates voice, the system could be set to automatically play a message onto the call in progress and/or disconnect the call, and/or alert officials, who could then listen in on the call and disconnect it at their discretion. A preferred embodiment of the present invention can also be configured to take the same or different action if an unauthorized voice is detected on the called-party side of the line. In a preferred embodiment which automatically plays a message onto the line after detecting an unauthorized called-party voice, the message played would request enrolment of the unauthorized voice which was detected, and failure to comply with the specified automated, semi-automated, or supervised enrolment process would result in automated disconnection of the call and/or alerting of call control officials.

For prisoners where concern over identity theft is not as high, automated or semi-automated enrollment may be allowed. Semi-automated enrolment takes place in the same way as supervised enrolment, but without the step of official verification of the inmate's identity. In a preferred embodiment, inmate records in database 1400 indicate whether supervised, automated, or semi-automated enrolment was used, and in cases where automated or semi-automated enrolment was used and subsequently identity theft is suspected, enrolled status may be revoked, and supervised enrolment may be required. In a preferred embodiment, corrections officers may review data from semi-automated enrolments at a later time to give an added level of approval and/or certainty to reviewed enrolments. In a preferred embodiment, conversation database 1400 includes both audio and video (and/or photograph) information associated with conversations, and associated information including data derived from audio and video information. In a preferred embodiment, electronic photographs and/or video are taken by electronic still and/or video cameras during the enrolment process, and corrections officials can later review enrolments and verify inmate identities both visually and auditorally. In a preferred embodiment, enrolments reviewed subsequently using both visual and audio data may be given a certainty rating on par with enrolments done under live official supervision.

In a preferred embodiment, semi-automated enrollment includes a step where the person enrolling is asked to speak his or her name, and possibly some other identifying data. The responses to these questions are stored in the conversation database in association with voice print data (and in the case of a called party, telephone number), and can easily be pulled up by call control officials and call reviewer reviewing a call at a later date. In a preferred embodiment, automated speech-to-text conversion is done on enrolment question responses, and text versions of answers to enrolment questions are stored in database 1400 in association with voiceprint data and/or called party phone number.

In a preferred embodiment for use in correctional institutions, photographic and/or video data of inmates are stored in the conversational database (time-correlated with conversation audio data) for some or all conversations that the inmates participate in, and this photographic and/or video data can be accessed by officials subsequent to or during a call to verify the identity of the inmate participating in the call. In a preferred embodiment, if the voice of an inmate placing a call is not verified within a pre-determined certainty level at the time the inmate places the call, the call may be flagged for later identity verification by officials, or the call may be blocked until real-time visual identity verification is done by officials. For instance, if an inmate has a cold and his voice has changed because of the cold, in a preferred embodiment, visual verification from electronic photographic data (still or video data) is used to verify the inmate's voice, and the inmates voice is temporarily re-enrolled with his current voice characteristics based on visual verification. In a preferred embodiment, database 1400 contains information indicating what corrections officers are familiar with a given inmate and are thus preferential for routing identity verification data to. A preferred embodiment of the present invention routes a photographic image of the inmate (for whom identity verification is needed) to the photo-capable cell phone of an appropriate corrections officer, and the officer is able to verify the identity of the inmate remotely. In a preferred embodiment, a correctional officer could also provide as an alternative his or her own verification of the inmates voice (for instance, via cell phone).

In an example of semi-automated enrolment of a called party, the inmate would make a first call to an allowed number, and the system would prompt the inmate to say the name of the person being called. The system would then play a message to the person answering the phone, stating that the call was from the calling inmate, and the given correctional facility, and stating who the call is for. The person answering the phone would then be asked by the automated system if he or she was in fact the person the call was intended for. If the answer was no, the person would be asked if the intended call recipient was available. If the intended call recipient was not available, the call would be automatically disconnected. If the intended recipient was available, the system would prompt that person to say his or her name (and perhaps some additional identifying information), and the system would automatically enroll that person's voice signature data in people database 1403 for ongoing use in voice verification on that call, and for voice verification on subsequent calls.

In a preferred embodiment for use in correctional institutions, once the voices of one or more persons at a phone number are enrolled in the system, the call placement protocol still requires the inmate to state who the intended call recipient is prior to placing the call, and each call recipient detected is asked to speak his or her name. In a preferred embodiment, when the calling party states the called party's name, and when the called party states his or her name, the recording of those stated names are tagged in the conversation database for quick access by call control officials and/or call reviewers. In addition, in a preferred embodiment, speech-to-text conversion is used to convert stated names into text form, and a separate associated level of certainty (of correct speech-to-text conversion) is generated for each name converted to text. In a preferred embodiment, when the certainty level of speech-to-text conversion of a spoken name is below a pre-determined threshold, the system automatically asks the person speaking to spell his or her name. In a preferred embodiment, if the spoken name of a person speaking is found not to match the enrolled identity of that person, an automated action is taken (where that automated action may be the creation of a notation in the conversation database, the alerting of an official, the playing of an automated message, or the automated disconnection or placing on hold of a phone call).

In a preferred embodiment, if fully automated enrollment is enabled for a particular called party phone number, it is assumed that persons who speak on the line during the first phone call to that phone number are to have their voice signatures stored as persons the calling inmate is allowed to speak to at that phone number. In a preferred embodiment, when previously unenrolled voices are detected on subsequent phone calls to that phone number, supervised or semi-automated enrollment procedures may be invoked.

In a preferred embodiment, if fully automated enrollment is enabled for a particular inmate, the first time that inmate makes a phone call and enters his or her identifying information via the telephone keypad the system uses subsequent speech from the inmate side of that phone call to automatically build a voice signature template for that inmate without prompting the inmate in any way.

In a preferred embodiment using semi automated enrollment of either an inmate or called party, the inmate or called party may be automatically prompted to give verbal answers to one or several identification verification questions (such as "what was your first pet's name?" or "what city were you born in?" or "what high school did you go to?"). In a preferred embodiment during subsequent phone conversations where the system determines that it is likely that an unauthorized person is speaking, the system may automatically interrupt a phone conversation and ask the person speaking to provide verbal answers to one or more identification verification questions.

In a preferred embodiment of the present invention for use at correctional institutions a preferred method of called party enrollment includes offering a financial incentive to called parties to enroll their voices in person at the correctional institution while visiting inmates. This allows corrections officers to verify the identity of called parties at the time of voice enrollment, and database records would reflect the type of verification done regarding the identity of called parties. In a preferred embodiment, voice enrollments done at the corrections facility in person are free of charge, while voice enrollments done over the phone are done for a fee which is either charged to a credit card or debit card belonging to the person enrolling or to the inmate.

In a preferred embodiment once the called party has been enrolled, that called party may be designated a trusted person allowed to verbally supervise the enrollment of other parties who may join conversations at the called party's location.

In a preferred embodiment of the present invention for use in prison phone systems, calling and called parties are not connected together on the line until the voices of both calling and called parties have been verified by the system as previously enrolled and allowed to be conversing.

In a preferred embodiment, the present invention automatically detects computer-generated speech, either through specifically stored models, or through the fact that computer-generated speech typically has much more consistent and tightly characterized parameters and human speech. The system may be programmed to take different predetermined actions depending on the circumstances under which computer-generated speech is encountered. For instance, computer-generated speech encountered at the beginning of a phone call may be taken as indicative of having reached a voicemail system while computer-generated speech encountered in the middle of a phone call may be taken as indicative of a three-way call, and different actions may be programmed for these different circumstances.

A preferred embodiment of the present invention incorporates automated speech-to-text conversion. In one aspect, separate speech-to-text conversion parameters are stored for each separately identified speaker, and these parameters are automatically updated and improved each time manually transcribed speech and accompanying audio are provided for that speaker, and each time automatically transcribed speech is manually corrected.

In a preferred embodiment, several techniques are combined to more accurately estimate boundaries between where one speaker stopped speaking in where another speaker starts speaking within a conversation. In one aspect, word boundaries and automated sentence and phrase estimating techniques are used as an aid to locating boundaries between speech segments from different speakers. In another aspect, detected differences in channel characteristics through which speech from different speakers is passing (for instance, differences in microphone spectral characteristics, differences in absolute loudness envelope, and differences between speech compression algorithms used on channels such as VOIP channels and cell phone channels) are used to help locate boundaries between speech segments form different speakers. In another aspect, brief tonal and absolute loudness speech cues indicative of one person interrupting another are used to help locate boundaries between speech segments from different speakers. In another aspect, iterative re-estimation (based on speech-to-text conversion) of boundaries between different speakers' speech segments, and iteratively improved (based on improved speech segment boundaries) speech-to-text conversion of different speakers speech segments may be applied several times in succession in order to improve both speech-to-text conversion and inter-speaker speech segment boundary estimation.

In a preferred embodiment of the present invention incorporating speech-to-text conversion, text derived from converted conversations are stored in database 1400 along with data which identifies the software version and parameter settings used to convert speech to text. In addition, in a preferred embodiment, probabilistic statistical models of each speakers speech text within a conversation and across conversations are also stored in database 1403. These linguistic probabilistic statistical models may for instance be Markov models indicating word probabilities based on the occurrence of nearby words, word usage frequency statistics and phrase usage frequency statistics.

In a preferred embodiment of the present invention incorporating speech-to-phoneme conversion, the phoneme symbols derived from converted conversations are stored in database 1400 along with data which indicates the software version and parameter settings used to convert speech to phonemes. In a preferred embodiment, the sertainty level of recognition of each phoneme is also stored in database 1400, along with alternate phonemes, and their probabilities. In addition, in a preferred embodiment, probabilistic statistical models of patterns of each speakers speech phonemes within a conversation and across conversations are stored in database 1400. These phonetic probabilistic statistical models may for instance be Markov models indicating phoneme probabilities based on the occurrence of nearby phonemes, phoneme usage frequency statistics and phoneme combination usage frequency statistics.

In a preferred embodiment of the present invention, database searches based in whole or in part on linguistic or phonetic speech mannerisms may be conducted utilizing linguistic and or phonetic probabilistic speech models stored in database 1400 for speakers within particular conversations and across multiple conversations. This search capability provides a novel investigative tool enabling investigators to locate persons likely to be part of the same social network (where word usage and phrase usage may be found to have commonalities), and to locate persons likely to come from different geographic areas (where particular phonetic pronunciations of words or phrases may be common). In addition, user-specified phonetic or text searches may be conducted within a conversation or across a set of conversations.

In a preferred embodiment of the present invention phonetic and/or linguistic speech mannerisms may be used as an additional tool to differentiate between speech of persons with similar voices.

A preferred embodiment of the present invention for use in corrections facilities includes a graphical user interface screen that enables corrections officers to easily establish such modes as turning the automatic call termination feature on or off, automatically registering each inmate voice print, automatically registering each called party voice print and identifying the called party[s] via the voice print, having the system display who is talking on the inmate side and the called party side by name, alerting the corrections officer, reporting, or cutting off the call based on alert conditions detected (such as detection of an unauthorized voice, detection of a three-way call, detection of conversations of a prohibited nature, detection of insufficient channel quality to reliably verify participants voices or convert speech to text, etc.). In a preferred embodiment, alerts generated are automatically routed to specified corrections officers (for example via cell phone). In a preferred embodiment, different corrections officers may specify different alert generating criteria and different user interface parameters. In addition, functions executed on the system by different corrections officers are logged as having been executed by those corrections officers and thus officers may call up their own past investigative actions and data as well as the past investigative actions data of other officers.

In a preferred embodiment, different alert sensitivities and/or detected circumstances are settable differently and simultaneously by different officials (for instance corrections officers in prisons, or customer service supervisor's in customer service organizations). In addition, alert sensitivities are settable to different levels for different monitored called or calling parties.

In a preferred embodiment of the present invention for use in prison phone systems, once initiated, calls may be continuously monitored for inmate and called party verification. When continuous monitoring is used, all speech detected originating from each end is checked against voice signatures of parties allowed to be on the call at that end. (In prison applications, it is assumed that only the prisoner who was identified as placing the call is allowed to be on the originating end of the call.) In a preferred embodiment where optimized use of computational resources is desirable (for instance for economic reasons), automatic periodic voice verification may be used instead of continuous voice verification. In such a case, the periodicity of monitoring may be set differently for different inmates and for different called parties, and the periodicity (up to and including continuous monitoring) may be set to one setting for the inmate side of the line and to another setting for the called-party side of the line.

In a preferred embodiment, rates of periodic voice verification may be specified differently for different inmates and for different called parties. In addition, periodic rates of voice verification may be set to be automatically readjusted depending on conditions detected. For instance, rates of intermittent voice verification may be automatically increased if the new voice is detected on the line, if a three-way call is detected, if a certain emotional state is detected for a particular party on the call, or if conversation about a particular subject is detected or particular key-phrase is detected in a conversation being monitored.

In a preferred embodiment of the present invention, software version information and parameter settings used to derive any data stored in database 1400 are stored along with the data they are used to derive. Thus one better software becomes available or better parameter settings are determined, the system may be configured to automatically derive data which investigators have marked as actually useful.

When monitoring or post-processing audio data from a telephone call on which telephonic directional separation is available, a preferred embodiment of the present invention utilizes a technique (which will herein be denoted as cross-squelching) to avoid processing background noise as speech when conversation participants are assumed not to be speaking. This technique takes advantage of the fact that it is unlikely participants at both ends of a conversation would wish to be speaking at the same time, and that for the rare instances when participants at both ends of a conversation are speaking at the same time, it is unlikely that any intelligible communication worthy of monitoring is taking place. Using the cross-squelching technique of the present invention, outgoing speech is fed to speech processing software (such as voice verification software, or LVCSR software) only during intervals where the incoming audio signal (for instance called-party digital audio 2017) is determined to be below an incoming lower threshold (which may preferably be derived as a predetermined fraction of the maximum recently observed value of called party digital audio signal 2017), and the outgoing audio signal (for instance inmate digital audio signal 2018) is determined to be above an outgoing upper threshold (which may preferably be derived as a predetermined fraction of the maximum recently observed value of inmate digital audio signal 2018). Symmetrically, incoming speech is only fed to speech processing software during intervals where the outgoing audio signal (for instance inmate digital audio signal 2018) is determined to be below an outgoing lower threshold (which may preferably be derived as a predetermined fraction of the maximum recently observed value of inmate digital audio signal 2018), and the incoming audio signal is determined to be above an incoming upper threshold (which may preferably be derived as a predetermined fraction of the maximum recently observed value of called-party digital audio signal 2017).

In a preferred embodiment, in addition to cross-squelching, further techniques are used to identify audio segments which are not deemed to be speech which should be processed for ongoing voice verification. In a preferred embodiment for use in prisons, audio from the inmate's phone is monitored during the time when the cross-squelching technique above indicates that called parties are speaking, and audio which is "heard" during such times at a level substantially lower than when the inmate is speaking is determined to be representative of background audio noise levels. In a preferred embodiment, during times when the called party is not speaking (so the cross-squelch function is not preventing analysis of audio from the inmate's side of the conversation), spectral analysis is done on the audio sensed from the inmate's side of the line, and if the ratio of low-frequency energy to high-frequency energy is not high enough, then it is assumed that any voice sounds present are coming from "far field" sources (such as people talking in the background), and that such speech should not be fed to the voice verification software. To prevent unauthorized prisoners from taking part in the conversation from the background and avoiding detection, a preferred embodiment blanks the audio from the prisoner's side of the line unless an audio signal meeting the qualifications for good signal-to-noise ratio and near-field speech is detected on the prisoner's line. Thus, in a preferred embodiment, called parties do not hear what is going on in the background where the prisoner is when the prisoner is not speaking. This prevents unauthorized persons (who may stand near the conversing prisoner) from participating in the conversation. If the prisoner speaks softly, close to the phone, the near-field detection algorithm will detect a sufficient ratio between low-frequency energy and high-frequency energy, and will thus determine that the voice is in the near field and thus pass the voice along to the voice verification processing system and/or to the called party.

In a preferred embodiment, segments of incoming and outgoing audio which are not deemed by the above criteria to be suitable to be passed on to speech processing software are assumed to be useful samples of background noise at the calling party and called parties telephones, and these noise estimates are used to do channel quality and signal-to-noise ratio estimation. In a preferred embodiment, ongoing channel quality and signal to noise ratio estimates are stored along with audio data and may be used in real time processing and/or post-processing of audio data. In addition in a preferred embodiment, processing of the incoming audio signal automatically detects such things as audio characteristics commonly arising from a variety of audio compression algorithms, and the likely compression method being used (such as one of a number of different cell phone compression methods, VOIP methods, etc.) is stored in the conversation database along with the certainty level that such compression method was accurately detected. In a preferred embodiment, parameters of algorithms used to process speech (whether in real time or post-processing) are adjusted based in part on estimated channel quality metrics, including likely knowledge of any audio compression algorithm that had been used on a particular speech segment. In a preferred embodiment utilizing high-quality compression or no compression of audio data stored in the conversation database, channel quality measurements may be made during post-processing. In a preferred embodiment utilizing substantial compression of audio data stored in the conversation database, channel quality measurements for speech segments are made prior to compression.

A preferred embodiment for use in correctional institutions, the detection of multiple compression methods within a call provides one possible method of detecting three-way calls, and the detection of a multiplicity of channel characteristics in different speech segments (whether any of the multiplicity of channel characteristics indicates compression or not) is used as one possible indication of the number of parties on the call, and an indication of how to diarize the call into speech segments from different call participants. In an embodiment which estimates speech segment compression methods in real time, an alert condition is generated when a speech segment is detected which has been subjected to a different compression method than had been detected previously in the call. In a preferred embodiment, such an alert condition can be used to play a predetermined message onto the call, and/or automatically disconnect the call, and/or alert corrections officials that a new party has likely joined the call.

In a preferred embodiment, one of the channel quality metrics detected is the occasional momentary audio blanking which appears in cell phone communication when the cell phone of a speaking party switches towers. In a preferred embodiment, audio segments which contain such blanking are identified within the conversation database as originating from a cell phone. In a preferred embodiment, various types of voice compression which are used in sell phones are automatically detected, and the type of compression which was detected is stored in the conversation database, correlated with speech segments in which such compression was detected.

In a preferred embodiment, in times of low system load (for instance late at night), various types of background processing may be programmed to take place automatically. Such processing tasks may include reprocessing of previously processed queries or conversation conversions would improve parameter settings or improved versions of software. For embodiments used in correctional institutions, background processing may also commonly include ongoing searches for identity theft within the correctional institution, ongoing searches for the appearance of voices of recently released inmates on the called-party side of current inmate phone calls, ongoing searches for the appearance of voices of corrections officers on the called-party side of current inmate phone calls (to detect forbidden relationships between inmates and corrections officers), and calculation and updating of research tools such as a current voice confusion matrix, speech mannerism confusion matrix, and combined voice and speech mannerism confusion matrix. Tools such as the voice confusion matrix are intended to aid investigators in spotting identity theft. In a preferred embodiment, low differentiation certainty indicated by the voice confusion matrix is used by the system to automatically determine when to apply additional automated computation resources (such as phonetics speech mannerisms detection and linguistic speech mannerisms detection) to live processing and post-processing of conversations as an additional aid in speaker identification or verification.

The term "voice confusion matrix", as used in this document, refers to a matrix which contains probabilities of voice recognition software confusing each enrolled voice with each other enrolled voice. In some instances, the number of enrolled voices in the matrix may be limited to a subset of all enrolled voices. For instance, in a preferred embodiment, when doing processing to detect identity theft within a correctional institution, only the voices of all enrolled inmates (and possibly the voices of enrolled corrections officers) would be used in the confusion matrix, since called parties are not going to be speaking on the inmate side of the line. The term "speech mannerism confusion matrix", as used in this document, refers to a matrix of probabilities that the system will confuse the speech mannerisms of one enrolled party with the speech mannerisms of another enrolled party.

In a preferred embodiment, a voice confusion matrix is assumed to have maximum validity when the same voice recognition software that was used to derive the matrix is used in processing a given conversation. In a preferred embodiment, the values in a voice confusion matrix may be modified given the quality metrics of the speech segment under consideration. Such quality metrics may, for instance, include speech and/or channel quality metrics, noise metrics, duration of speech in a given segment which is deemed to be above various quality thresholds, etc.

In a preferred embodiment, a speech mannerism confusion matrix is assumed to have maximum validity when the speech mannerism measurement and categorization software that was used to derive the matrix is used in processing a given conversation. In a preferred embodiment, the values in a speech mannerism confusion matrix may be modified given various quality metrics of the speech segment under consideration. Such quality metrics may, for instance, include speech and/or channel quality metrics, noise metrics, duration of speech in a given segment which is deemed to be above various quality thresholds, number of times various speech mannerisms are detected, etc.

In a preferred embodiment of the present invention an automated parameter adjustment aid is provided which allows a user to direct the system to automatically adjust a parameter to the point where the parameter value is just above or just below the threshold at which a certain condition is detected. The system will automatically reprocess conversation data being analyzed, incrementally adjusting the desired detection parameter until the desired threshold detection condition is achieved. Another feature allows for the automated readjustment of detection thresholds based on false positives and false negatives noted by persons reviewing automatically detected conditions. Users (such as corrections officers or customer service supervisor's) are given the option to provide feedback to the system during call review or in a survey after call review.

In a preferred embodiment, the system monitors detection parameters as they are varied by each user over time, and derives and provides simplified parameter variation knobs for each user, within the standard graphical user interface.

In a preferred embodiment for use in correctional institutions, data on prisoners' current medical condition may automatically be made available to the system such that prisoners who are currently known to have come down with the cold subsequent to their last phone call may automatically have their voice identity accepted even though it would have been outside normal identity parameter tolerances, as long as the parameter changes are within what would be expected if that person had a cold. In an alternate embodiment, additional identity confirmation from a corrections officer may be required, and a photographic image of the inmate may be routed to a corrections officer (for instance, via cell phone) for identity confirmation. In an alternate embodiment, if an inmate's voice does not pass voice verification, an additional biometric verification (such as an automated fingerprint verification) may be used to enroll the inmate's current voice characteristics under his or her identity in database 1400.

In applications of the present invention in prison phone systems, it may be significantly more important to detect short conversational segments coming from an unidentified party. In order to facilitate such detection a preferred embodiment of the present invention provides the option of reprocessing different groupings of speech segments from a particular conversation after diarization. Diarization is preferably performed first utilizing directional telephonic separation second utilizing a combination of speech segment volume envelope differentiation, channel characteristic detection, and small-group voice identification (identification of which person within a small group of people is speaking) where the small group consists of persons known to be on the called party side of the call. Volume envelope differentiation can usually do a very good job at separating speech segments which come from a party who has been conferenced in to a call, from speech segments which come from the called party who set up a conference call. Volume envelope differentiation can also provide good differentiation between speech segments coming from different telephones in the same house. Channel characteristic detection can be used to identify speech segments which pass through channels with identifiable characteristics. For instance, speech from a cell phone will likely have detectable characteristics present due to the voice compression algorithm used in the cell phone, and speech from different land-line extensions may be identifiable from spectral influences of the particular microphone on the phone being spoken into, which may be detected during intervals when the speech signal can be assumed to have broadband smooth-spectrum characteristics, such as during the enunciation of "s" and "sh" sounds.

When an unidentified person is present in a conversation and that unidentified person only speaks briefly and occasionally, the automatic conversations segment regrouping feature of the present invention allows the detection of a consistent new voice model from grouped short conversational segments processed as a single conversational segment.

When poor channel quality is detected during initial enrollment, the present invention offers the option of automatically replacing speech model data derived during poor channel quality conditions with subsequent speech model data derived under improved channel quality conditions, provided the identity of the person speaking under improved channel quality conditions has been determined to be the same as the identity of the original speaker within an acceptable level of certainty.

The present invention takes advantage in several ways of a large corpus of recorded conversations which correctional institutions and customer service departments typically have on hand. In correctional institutions applications, the present invention offers the capability of automatically scanning archived phone conversations associated with a particular prisoner, building a voice signature model for that prisoner from those past phone calls and automatically detecting and flagging past phone calls which may have been made by another prisoner utilizing a false identity. Utilizing this feature of the present invention during installation aids corrections officers in identifying which inmates should be voice-enrolled under supervision, and which inmate's phone calls merit the most computational resources for future automated violation detection.

A preferred embodiment of the present invention offers the capability of automatically scanning archived past phone conversations involving a particular individual, and building a speech mannerism model for that individual. In a preferred embodiment, a derived speech mannerism model includes: frequency and linguistic models of use (derived through analysis of text-converted speech) of various phrases, correlation between phrase use and person and being spoken to, correlation between phrase use and derived prosodic indicators (such as emotional state and rate of speaking), and correlation between speech mannerisms and known state of health or known recent influential events which have transpired.

In addition to building voice identification models from a past corpus of recorded conversations, in a preferred embodiment of the present invention, representative recorded conversation segments from individuals for whom it is desired to implement automated speech text conversion are automatically routed to human transcriptionists, who either wholly transcribe the routed speech segments, or who correct first-passts automated speech-to-text conversion provided by the present invention. It manually transcribed or corrected text files are then used to automatically improve language models used for each individual by the speech-to-text conversion engine of the present invention. In a preferred embodiment, audio is delivered for human transcription via standard phone lines, or VOIP phone lines, or via the Internet in the form of sound files to transcriptionists in remote locations such as India, where computer-proficient English-speaking persons are available at low hourly wage rates. In addition to or instead of transcribing speech segments, a preferred embodiment of the present invention facilitates the use of remote personnel to manually verify speech segment diarization boundaries within multiparty conversations processed by the present invention.

In a preferred embodiment of the present invention for use in correctional institution or customer service telephone systems, the graphical user interface used to monitor or review a telephone conversation includes the automatically derived address of the remote party on the call and/or other automatically derived geographic and/or demographic information associated with that address such as interactive or non-interactive maps, property values, average income, or other demographic data associated with that address. In a preferred embodiment, demographic and geographic information derived from called-party phone numbers and/or other information is stored in database 1400 in a manner associating such information with the called party phone number.

A preferred embodiment of the present invention for use in prison phone systems allows investigators to automatically scan recorded conversations to test whether new criteria being considered for cutting off phone calls or providing alerts actually does a good job at detecting situations the criteria are intended to detect.

In a preferred embodiment of the present invention for use in prison phone systems, a graphical user interface (such as depicted in FIG. 18) incorporates markings indicative of alert conditions generated (such as "unauthorized person detected in conversation", or "three-way call detected") and actions taken in response to those alert conditions (such as "call automatically interrupted for additional identity verification", or "call automatically terminated", or "corrections officer patched into call").

In a preferred embodiment of the present invention, in addition to identifying prosodic attributes of speech segments within conversations, trans-prosodic attributes of conversations are identified and cataloged in the database as well. The term "inter-prosodic" within this document shall refer to all non-vocabulary-based characterization of the quality of conversation between two or more persons. For instance a conversation between two people might be characterized as confrontational, friendly, teaching, order giving/taking cooperative, etc. The term "trans-prosodic" within this document shall refer to non-vocabulary-based patterns of the quality of a given speaker's speech across a substantial portion of a conversation or lengthy speech segment (for instance, across a portion of a conversation or speech segment long enough for an emotional pattern to be distinguishable).

A preferred embodiment of the present invention allows investigators to attach voice annotations to conversation files they review, and automated speech-to-text conversion converts these voice annotations to text, facilitating their use in reports which investigators may subsequently write, and facilitating automated searchability of past comments and annotations made by investigators.

A preferred embodiment of the present invention provides for text assisted marking of speech segments within a recorded conversation. Using this feature, when an investigator wants to mark the start and end of a speech segment that will assist him in an investigation, he types in text (or enters the text by speaking into a speech-to-text converter) sufficient to identify the beginning and end of the segment of conversation he wishes to locate, and the system automatically locates the corresponding audio and creates graphical queue marks (indicating the beginning and end of the specified speech segment) on the graphical user interface of the present invention. This technique of text-specifying graphical markings of the desired conversational segment is significantly easier to use, and in many instances can save significant time over current purely graphical methods of marking segments of a recorded conversation. Alternately the present invention allows the investigator to display the text of a conversation which has been derived through speech-to-text conversion, and highlight and annotate segments of that text. Annotation may be done in text form or in audio form and automatically converted to text, and graphical queue marks are automatically generated on the graphical user interface indicating the beginning and end of the audio segment which was highlighted in textual form. In a preferred embodiment, while reviewing audio of a recorded conversation, investigators may simultaneously be reading the corresponding text of the conversation which was automatically and or manually transcribed. Placing the text cursor at a particular position in the text places the graphical cursor at the corresponding position in the graphical representation of the conversation (such as shown in FIG. 18), and vice versa.

In a preferred embodiment for use in prison phone systems, the present invention provides a new method of detecting three-way calls through a combination of key-phrase detection (looking for connection-requesting key-phrases and phrases such as "call", "conference in", "on the line", "ring up", "contact", "get hold of", "hang on", "hold on", etc., and/or greeting key-phrases and phrases such as "hi", "hello", or the like found at the beginning of a speech segment.), silence detection, blowing into the phone, call progress tones, etc.

In a preferred embodiment of the present invention, speech generated close to a telephone receiver is differentiated from speech generated far from a telephone receiver through the low-frequency spectral differences between near-field speech and far-field speech. This spectral difference is used to differentiate between speech from a conversational participant and background speech.

In embodiments where it is desirable to characterize different types of background noise where the cross squelch detector of the present invention indicates that a particular segment of audio is likely to be background noise, various detectors may be applied to the segment to determine the character of the noise. For instance, a spectral match to a comb filter may indicate speech whereas a swept tone may indicate a siren etc. A preferred embodiment of the present invention includes the ability to process conversation audio data to recognize a variety of background noises, such as doors closing, typing on a keyboard, doorbells, dogs barking, etc., and annotate the conversation database to indicate the existence of these sounds. In a preferred embodiment, such background sounds being identified during a particular conversational segment can be used to except that segment from voice identification processing.

In a preferred embodiment, key-phrase detectors, silence detectors, click detectors, and toned detectors of the prior art may be used in combination with the present invention to trigger increased processing power to be allocated to a given conversation for detection of unauthorized voices, telltale prosodic indications, or telltale signs available through speech-to-text conversion, which may indicate conditions meriting automatic call cut-off and/or further investigation. For instance, discussion of news stories has been found in the past to sometimes be indicative of conversations which may be of interest to investigators.

In a preferred embodiment for use with prison phone systems, in order to save voice verification time and increase certainty of valid inmate identification, the present invention uses a combination of a challenge and response algorithm, speech-to-text conversion, and speaker voice verification software to initially achieve a high degree of confidence that the inmate speaking has been correctly identified, and the system then switches over to purely running continuous or periodic voice verification (and/or continuous or periodic photographic and/or video monitoring) to maintain confidence that the same speaker is still speaking. Such an implementation has the added advantage of being more suitable for updating voice verification files over time with minimal risk of identity theft. During the challenge and response portion of the identification process the inmate may be asked a small variety of questions which are a subset of a large variety of questions which the system asked the inmate during the enrollment process.

A preferred embodiment of the present invention for use in prison phone systems allows the option of building and storing different voice models, phonetic voice mannerism statistics, and linguistic voice mannerism statistics for a given inmate based on the telephone number the inmate has dialed or on the person at that number to whom the inmate is speaking. This allows for more accurate ongoing voice and conversation-based identification since it is assumed that the inmate may have different conversational styles (personas) depending on who he is speaking with. For instance the inmate may use a seductive voice when talking to his girlfriend, make talk respectfully when talking to his mother, may curse frequently when talking to his brother, etc.

In a preferred embodiment for use in prison phone systems, certain prosodic indicators and/or speech mannerism indicators and/or key-phrase indicators and/or linguistic structure indicators may be used to detect conversations worthy of more processor power or manual review. For instance, a conversation participant speaking with a lower apparent volume, or speaking in whispers rather than voiced words may indicate that the person speaking seeks to avoid detection while speaking of something that it is felt that authorities would wish to detect. Within this document, the term "key-phrase" shall be used to denote any word, phrase, or phonetic utterance which one might wish to detect or search for in a conversation. It is known in the art that recorded conversations may be made searchable either by speech-to text conversion (used in conjunction with text searching), or by speech-to-phoneme conversion (used in conjunction with phoneme sequence searching). It is to be assumed that whenever a text search is mentioned in this document, an alternate embodiment would use a phonetic sequence search, and vice versa. It is also assumed that as an alternative to any exact search, a statistical "close match" search may also be done, and that various methods of quantifying the "closeness" of matches are known in the art.

Preferred embodiments of the present invention communicate automatically with a centralized prosody, speech model, and speech mannerism database, allowing different installations of the present invention to both contribute to and benefit from general speech models and prosody models, as well as gender specific models, demographic-specific models, and geographic-specific models. Owners of different installations of the present invention may also choose to contribute their own investigative and training strategies which they have developed around the features of the present invention. It is envisioned, for instance, that customer-service departments could pay to become members of a cooperative which develops increasingly useful early warning indicators and customer service agent training methods. It is also envisioned a correctional institutions may wish to contribute to and benefit from a nationwide database of phone numbers inmate should not be allowed to call, and a nationwide database of voice and conversation style data of known criminals.

In a preferred embodiment of the present invention for use by financial institutions, initial voice verification is used as part of securely positively identifying callers, and automated ongoing voice verification makes sure that after the caller who converses with a customer service agent subsequent to voice verification is still the originally identified party.

In a preferred embodiment, speech which is diarized with 100% certainty (for instance because it comes in in a different electronic channel, such as the two channels of four-wire telephony, computer speech which is played onto a channel from a seperatable source, or multiple lines on a conference bridge), or a high degree of certainty (for instance when speech comes from a certain direction as determined by a directional microphone array), the speech may be channelized prior to being stored, rather than stored in a single channel. In such an embodiment, diarization of time-overlapping speech segments is possible.

In a preferred embodiment, aspects of conversations which are derived (such as speaker identity, text-converted speech, prosody factors, etc.) are displayed graphically on a user interface, along with their certainty levels. In a preferred embodiment, such graphical displays are available in real-time as a conversation is being listened to, both in live conversation monitoring applications, and applications where previously recorded conversations are being reviewed.

In a preferred embodiment for use in applications where many conversation channels are monitored simultaneously (such as in a customer service department or a correctional institution), the computation associated with the present invention is performed on custom-designed hardware which may be used in addition to or in place of a personal computer.

In a preferred embodiment for use in conversational interaction training, a user can query the conversation database for a particular type of interaction, and queue up playing sequentially a number of such interactions. For instance, if John is a customer service agent and he is training himself not to negate what a customer says, he could query the database for examples of past recorded conversation segments where his response to something a customer said started with the word "no", where the preceding customer speech segment did not end in a question. On one aspect, he could choose how long a preceding speech segment to play, and how long of his negating response to play (for each example found), and he could rapidly play a number of such interactions in sequence to train his mind to recognize the type of situation in which he negates something a customer says, and build a new habit of interacting in a more constructive way.

In another aspect, a preferred embodiment of the present invention includes a microphone for use in interactive practice sessions which allow a user to practice responding to recorded conversation segments. In such an embodiment, the above example may be extended such that John can have the system only play the conversation segments he previously responded negatively to, and he can practice (live) responding in a different way (for instance, affirming the customer's feelings and then leading the customer to a beneficial way of viewing the situation. In such an embodiment, the present invention may be configured to save John's practice responses in the conversation database, tagged as training data, so that John's supervisor can listen to those responses to monitor John's progress. In a preferred embodiment, John's practice responses would be analyzed by the system as he responded, and he would be provided with immediate feedback regarding speech prosody factors such as tonality. In a preferred embodiment utilizing speech-to-text conversion, John would also be provided with automated feedback regarding likely efficacy in presenting potentially useful points of view to the customer.

In a preferred embodiment for use in correctional institutions, voice models are acquired (either through automated, semi-automated, or supervised enrolment) for all conversation participants at each dialed number, and stored in conversation database 1400 as associated with that number. In a preferred embodiment, associated identifying data is stored associated with such voice models. For instance, the name of an inmate's sister, the fact that she is his sister, her age, place of residence, etc. is preferably stored linked to her voice model and samples of her voice. In a preferred embodiment for use in correctional institutions, each time a new voice of a called party is enrolled, the enrolling party is asked to speak his or her name and his or her relationship to the calling inmate, and if the detected voice during the response speech segment is identified as the same person as the previously detected new voice, then the identifying speech segment is stored as such in the conversation database. If it is determined that the voice response to the automated request is unlikely to be the same as the new voice which was detected which caused the automated request, then the interaction is flagged in the conversation database so that officials can investigate.

Within this document, the term "call control official" shall be used to refer to any person who has the authority to interrupt a phone call which is in progress. Such interruption could be by joining the call, temporarily disconnecting one or more parties from the call, disconnecting the entire call, or disabling one or more parties ability to be heard on the call.

In a preferred embodiment for use in correctional institutions, the present invention provides a noise injection feature which injects noise into the conversation such that the participants hear the noise (and thus talk louder and/or more clearly in order to be understood), but the noise does not appear in the conversation as it is monitored and/or recorded. In an embodiment intended for integration with institutional four-wire digital telephony, monitoring of incoming and outgoing audio streams is performed separately, and noise is summed into each digital pathway after the respective monitoring points. In an embodiment intended for use in two-wire telephony, noise of a known amplitude is added onto the line, and then the noise signal is subtracted from the monitored audio. The noise injection aspect of the present invention may be thought of as providing a non-selective adulteration to the audio signals heard by conversation participants.

In a preferred embodiment for use in correctional institutions, the present invention provides an audio threshold gateway feature which only allows audio to pass unadulterated between calling and called parties if certain audio pass characteristics are met. In a preferred embodiment, selectable and adjustable audio pass characteristics include: absolute loudness of the audio signal being above a predetermined threshold, computed speech signal quality (including lack of secondary voices) being above a predetermined threshold, speech signal-to-noise ratio being above a predetermined threshold, near-field characteristics being above a predetermined threshold (such that the ratio of near-field audio to far-field audio is computed to be sufficient for good speech monitoring), and combinations of these metrics. In a preferred embodiment, the pass characteristics may be separately defined for calling and called parties, may be individually dynamically adjusted during a conversation (for instance, based on the probable detection of a three-way call, or the detection of a key-phrase).

In a preferred embodiment, when pre-determined pass characteristics are not met, an adulterated version of the audio (which did not meet the pass characteristics) is passed on to the other end of the conversation (called or calling party or parties). In a preferred embodiment, the nature of the adulteration may include attenuating the audio signal before passing it on (including possible attenuating the audio signal 100%, effectively blanking the signal), adding noise or other sounds to the signal, or some combination of these techniques. A preferred embodiment combines attenuation with the addition of noise when pass characteristics are not met, such that the listening party or parties at the other end of the line always hear some audio signal, and thus do not know that the original audio signal from the other end of the line has been attenuated during intervals when it does not meet pass criteria.

Figure 20:
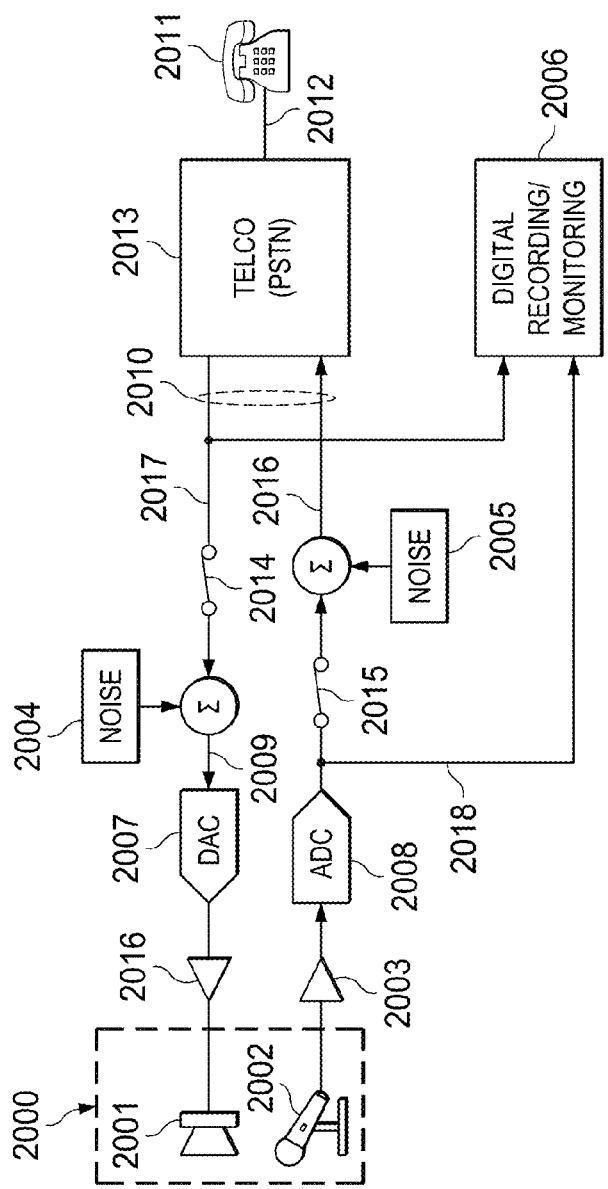
FIG. 20 is a block diagram of the selective and non-selective audio adulteration features of the present invention used to insure minimal signal-to-noise ratio in monitored and/or recorded conversation signals.

FIG. 20 is a block diagram of the hardware used to implement the above-described selective or non-selective signal adulteration schemes. Inmate telephone handset 2000 comprises handset speaker 2001 and handset microphone 2002. Electrical audio signals generated at microphone 2002 are amplified by amplifier 2003 and converted to digital audio signals by analog-to-digital converter 2008. Resulting inmate digital audio signal 2018 is monitored by digital recording/monitoring system 2006. If digital recording/monitoring system 2006 determines that predetermined minimal signal quality characteristics for inmate digital audio signal 2018 are not met, controllable inmate attenuator 2015 (which may be a switch for 100% attenuation, or some other form of controllable attenuator for partial attenuation) is set to attenuate inmate digital audio signal such that inmate audio present in adulterated inmate digital audio signal 2016 is at a lower level than inmate audio present in inmate digital audio signal 2018. In addition, noise of a controlloable level from noise generator 2005 may be summed into inmate digital audio 2016 (for instance, such that the volume envelope of inmate digital audio signal 2016 does not decrease when the attenuation of controllable attenuator 2015 is increased).

Adulterated inmate digital audio signal 2016 and unadulterated called-party digital audio signal 2017 comprise a "four-wire" digital connection 2010 to public switched telephone network (PSTN) 2013, which remotely connects to analog or digital called party line 2012, which connects to the called party or parties through called party phone 2011.

In this example of the present invention for use with an on-premises digital phone system, audio from called party phone 2011 is delivered to digital recording/monitoring apparatus 2006 of the present invention as unadulterated called-party digital audio 2017. If pre-determined called-party audio pass characteristics are not met, controllable attenuator 2024 (which may be an electronically controlled switch, or some other form of electronically controllable attenuator) is set to attenuate called party digital audio. In addition, controllable-amplitude noise source 2004 may be set to sum noise into called party digital audio 2017, such that the called party audio that the inmate hears has a degraded quality in comparison to the called party audio 2017 being monitored and/or recorded by digital monitor/recorder 2006, and such that the overall volume of the audio signal 2009 heard by the inmate does not decrease as controllable attenuator 2014 is adjusted. Digital-to-analog converter 2007 and amplifier 2016 convert adulterated called-party digital audio signal 2009 into an analog electrical signal suitable for driving inmate telephone handset speaker 2001.

In simpler embodiments, any sub-combination of attenuators 2014 and 2015 and noise sources 2004 and 2005 may be used, and either noise source 2004 or 2005 or both may be simplified to constant (rather than controllable) noise sources, and either attenuator 2014 or 2015 or both may be simplified to fixed (rather than controllable) attnuators. For instance, attenuators 2014 and 2015 may be used without noise sources 2004 and 2005, or noise sources 2004 and 2005 may be used without attenuators 2014 and 2015, or noise source 2004 and/or attenuator 2014 may be used without noise source 2005 and/or attenuator 2015.

Figure 21:
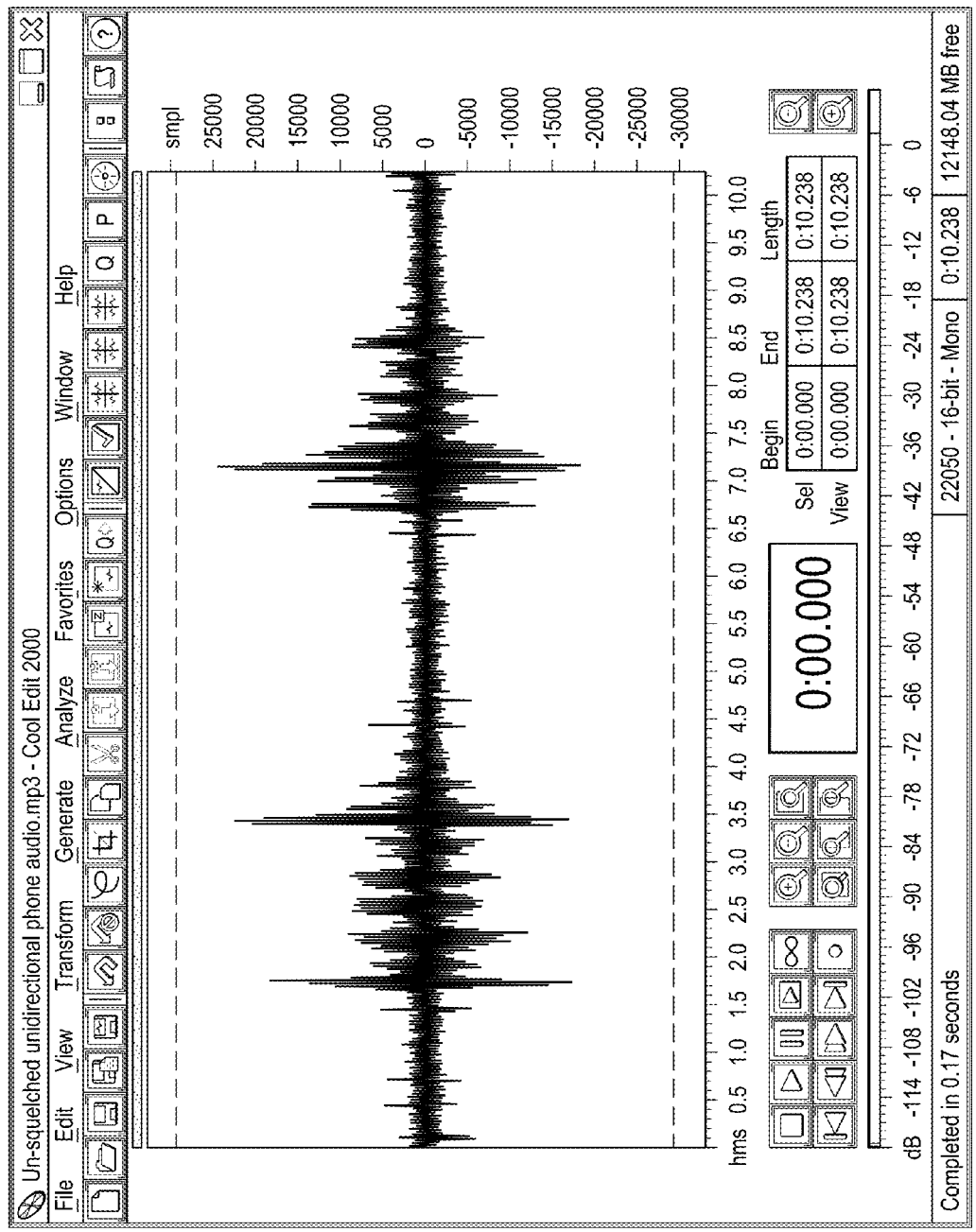
FIG. 21 is a time-domain waveform of unidirectional speech on a phone conversation.
Figure 22:
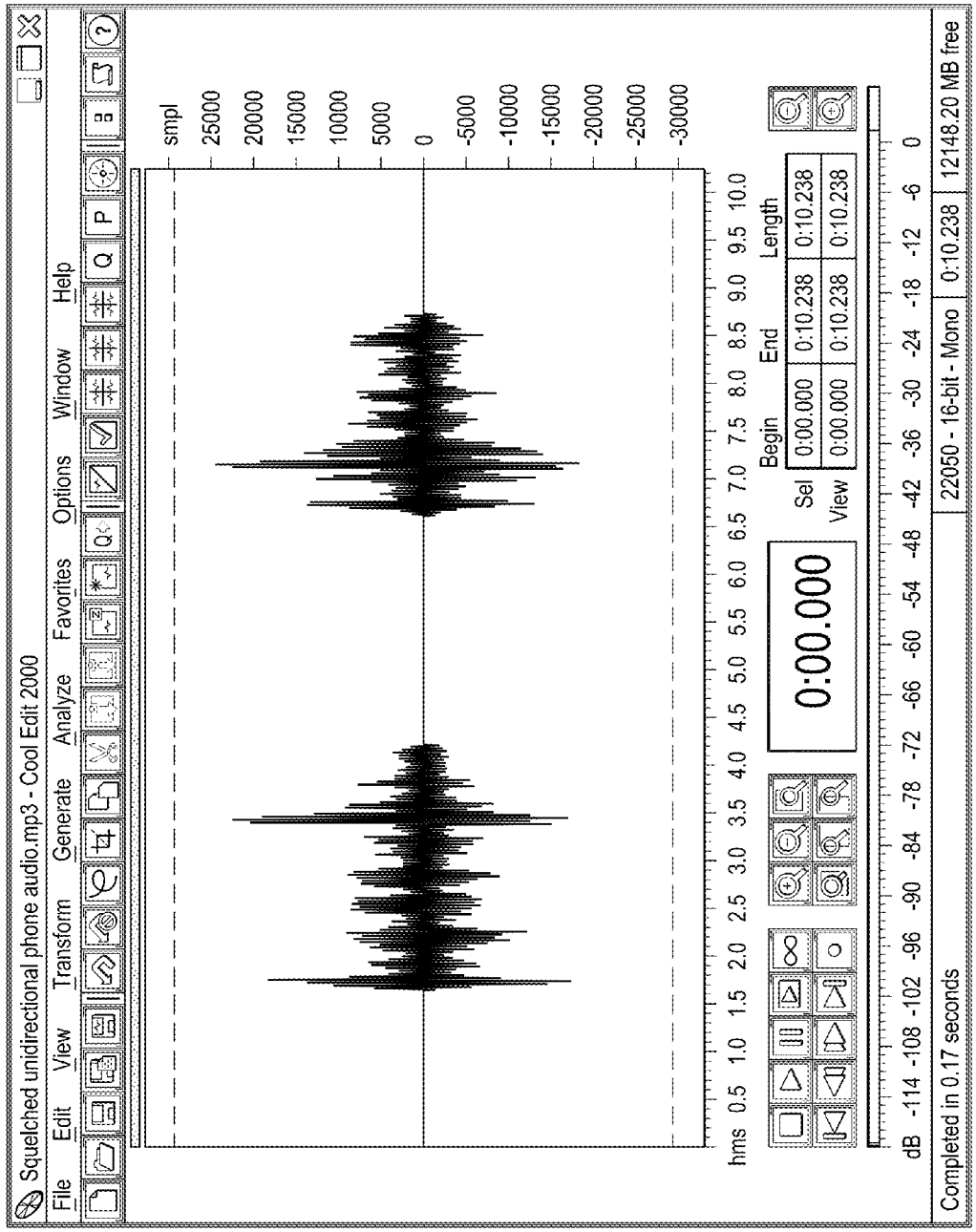
FIG. 22 is the time domain waveform of FIG. 21, with segments of the waveform who's amplitude is below a predetermined threshold attenuated to zero.
Figure 25:
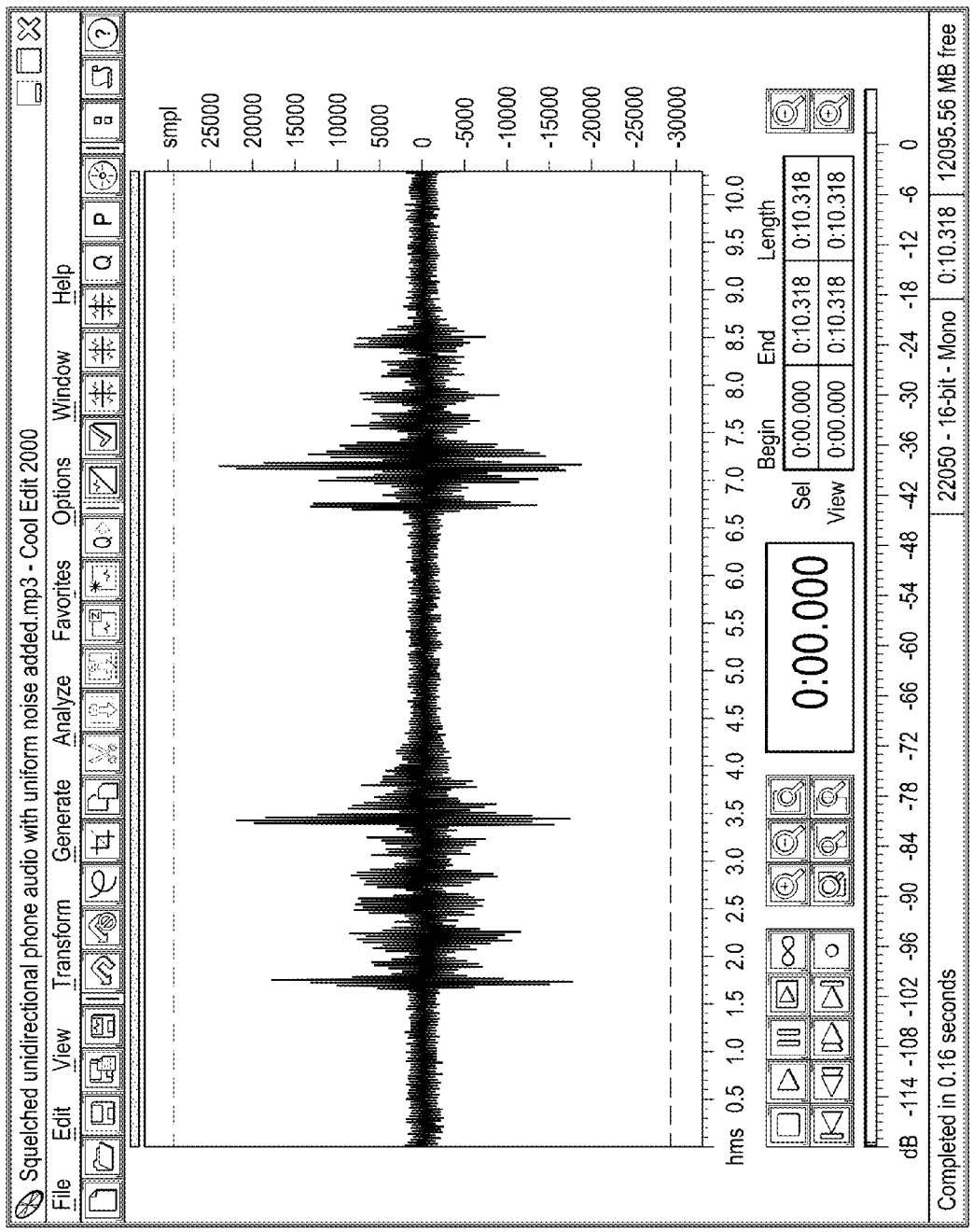
FIG. 25 is the time-domain waveform of FIG. 22, with noise of uniform amplitude summed in across the entire waveform.

Waveforms processed using different rules to controllable attenuators 2014 and 2015, and different rules to crontrol controllable noise sources 2004 annd 2005 are shown in FIGS. 21-25. FIG. 21 is an unadulterated time-domain waveform representing a segment of a unidirectional conversation signal (such as called party signal 2017 or inmate signal 2018). FIG. 22 is the waveform of FIG. 21, processed using 100% with 100% attenuation for all portions of the waveform who's amplitude is below a pre-determined threshold. Listening to such a waveform woud sound strange, because background noise would also be attenuated 100% during times when speech was attenuated 100%. A more natural-sounding waveform is shown in FIG. 25, where uniform noise is summed in across the entire waveform (both during attenuated portions and untenanted portions alike). The amplitude of the summed noise is chosen to be approximately the same as the background noise level detected in waveform 21 during the attenuated intervals of waveform 22.

Figure 23:
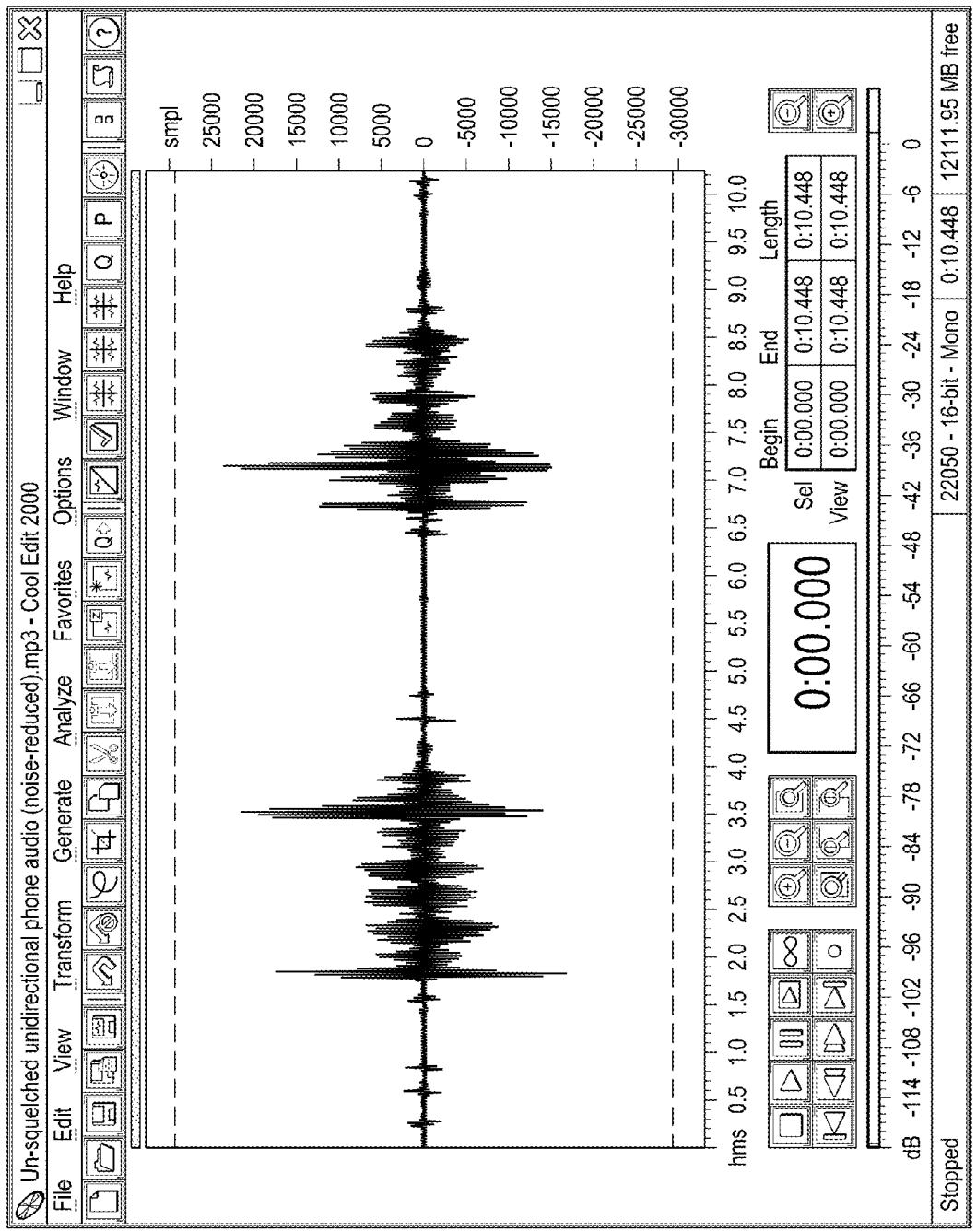
FIG. 23 is a noise-reduction-processed version of the waveform shown in FIG. 22.
Figure 24:
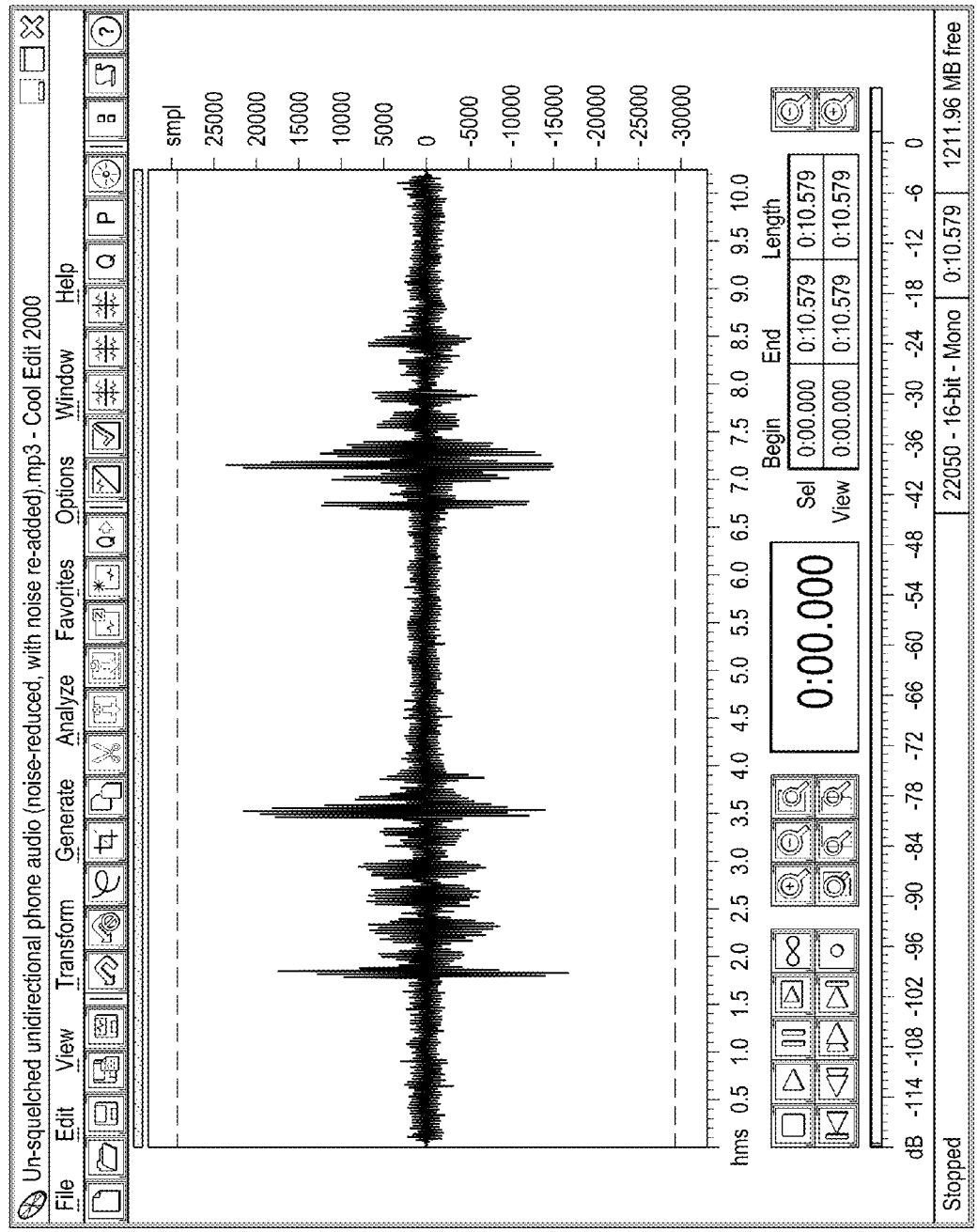
FIG. 24 is the time-domain waveform of FIG. 23, with noise of uniform amplitude summed in across the entire waveform.

In an alternate preferred unadulterated audio is processed with a noise-reduction algorithm which uses an estimated level of background and "noise-reduces" the signal of FIG. 21 to produce a noise-processed signal such as shown in FIG. 23. A preferred embodiment either then selectively attenuates all portions of FIG. 23 which fall below a pre-determined value, or sums a constant noise signal in to the signal of FIG. 23 to produce the signal shown in FIG. 24, or both. In such an embodiment, speech recognition software may be used to process either the unadulterated signal (during non-attenuated portions of the adulterated signal), or speech processing may be performed on the intermediate (noise-reduced) version of the adulterated signal (prior to the re-adding of noise).

In a preferred embodiment of the present invention, facilities using the present invention are preferably periodically or continually connected to a central location providing services in connection with the present invention, and desired new types of search queries for searching the conversation database and desired new types of alert conditions for monitored conversations may be submitted by users to the central location. In a preferred method of doing business in customer service using the present invention, requests for new search query capabilities and new alert-generating capabilities are processed, and new search and alert algorithms and criteria are tested for efficacy against actual customer conversation databases, and new algorithms and criteria which are found to be effective are added as search and/or alert features (for instance, by being added to search and/or alert menus).

In a preferred embodiment, desired search and/or detection criteria are added to an "example marking" menu, and this menu may be used by users to mark conversation segments felt to meet the indicated criteria. For instance, if a financial institution wants to be able to search its conversation database for instances of customer service representatives negating something a customer said or detect such a condition live in real time while monitoring conversations), and such search or detection criteria is not yet available, the present invention allows the user to add such criteria to a "desired criteria" menu, and use that menu to mark conversation segments (either during conversation review, or in real time during a conversation) as meeting the desired criteria. In a preferred embodiment, these examples are then reviewed at a central location and used to develop automated search and detection algorithms.

In a preferred embodiment, real-time annotation and post processing annotation of conversations may be done. In a preferred embodiment, annotation may be done in three ways:

1) Voice annotation
2) Text annotation
3) Annotation from an annotation menu.

In a preferred embodiment, when annotation is done from a menu, the menu may be either a "notation" menu (in which case it is not associated with a current or desired search or detection function), or the menu may be a "desired search or detection criteria" menu (as described above), or it may be a currently available search or detection criteria menu.

In a preferred embodiment, voice annotation is automatically converted to text and is searchable in the conversation database, and prosodic information is automatically extracted from voice annotations and is also searchable within the conversation database.

In a preferred embodiment for use in customer service applications, a "live voice annotation" feature allows a customer service representative to mute his side of the line and use his telephone microphone to make a voice annotation while the customer is speaking. A preferred embodiment also allows customer service representatives to make annotation immediately following a call, including annotation from entered as the results of a post-call survey (which may be made either as voice annotations, text annotations, or menu annotations). In customer service applications, annotations made in real time or immediately subsequent to a call by customer service representatives aid supervisors in training customer service representatives, and understanding customer needs and needs of customer service representatives. Annotations made by supervisors can aid in training of customer service representatives.

In a preferred embodiment of the present invention for use in correctional institutions, database 1400 may contain enrolled biometric identification data of a number of different types for the same inmate, and initial biometric identity verification of the inmate participating on a call may be done by fingerprint scan, voice verification, retina scan, photographic verification, or other biometric verification, and subsequent ongoing identity verification may be done by the same or other means. For instance, in one preferred embodiment, initial identity verification may be done via fingerprint scan, and that scan may be used to verify or authorize the enrolment of that inmate's voice or photographic biometric data, and that subsequently enrolled biometric identification data may be monitored periodically during a call to verify that the identity of the inmate participating in the call remains the same. In an alternate embodiment, fingerprint or photographic data might be used to initially verify the identity of an inmate on a call, and subsequent periodic voice verification could be used to verify that the identity of the inmate on the call does not change.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

The invention claimed is:

1. A method, in an inmate telephone monitoring system, for detecting the voice of an unauthorized person in a conversation on a phone call between an incarcerated inmate on a calling-party side of a phone line and at least one called party on a called-party side of the phone line, comprising:
    initially verifying, by the inmate telephone monitoring system, the authorization of an inmate voice on the calling-party side of the line;
    setting the frequency of an automatic periodic voice verification based on the incarcerated inmate or the called party;
    subsequently performing the automatic periodic voice verification, by the inmate telephone monitoring system, on at least one side of the line during the conversation to detect the voice of an unauthorized conversation participant, wherein the voice verification utilizes spectral analysis of a digitized representation of the conversation;

generating an electronic signal indicative of the detection of the voice of an unauthorized person within said conversation; and Automatically increasing the frequency of said periodic voice verification, by the inmate telephone monitoring system, subsequent to the detection of one of an unauthorized voice during said conversation, wherein the frequency increase includes varying of frequency of the periodic voice verification based on the system computational load.

2. The method of claim 1, further comprising:

varying the frequency of said periodic voice verification in response to detection of specified interaction characteristics between parties of said conversation.

3. An inmate telephone monitoring system for detecting the voice of an unauthorized person in a conversation on a phone call between an incarcerated inmate on a calling-party side of a phone line and at least one called party on a called-party side of the phone line, the system comprising:

a processor; and a memory coupled to the processor, the memory storing computer-readable instructions that, upon execution by the processor, cause the system to:

initially verify the authorization of an inmate voice on the calling-party side of the line;

set the frequency of an automatic periodic voice verification based on the incarcerated inmate or the called party;

subsequently perform the automatic periodic voice verification on at least one side of the line during the conversation to detect the voice of an unauthorized conversation participant, wherein the voice verification utilizes spectral analysis of a digitized representation of the conversation;

generate an electronic signal indicative of the detection of the voice of an unauthorized person within said conversation; and automatically increase the frequency of said periodic voice verification subsequent to the detection of an unauthorized voice during said conversation, wherein the frequency increase includes varying of frequency of the periodic voice verification based on the computational load of the monitoring system.

4. The system of claim 3, the memory storing additional computer-readable instructions that, upon execution by the processor, cause the system to:

vary the frequency of said periodic voice verification in response to detection of specified interaction characteristics between parties of said conversation.

* * * * *